United States Patent
Morita et al.

(10) Patent No.: US 10,301,214 B2
(45) Date of Patent: *May 28, 2019

(54) LIQUID COMPOSITION, GLASS ARTICLE AND METHOD OF FORMING COATING FILM

(71) Applicant: AGC Inc., Chiyoda-ku (JP)

(72) Inventors: Shimpei Morita, Chiyoda-ku (JP); Hirokazu Kodaira, Chiyoda-ku (JP); Takashige Yoneda, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 186 days.

This patent is subject to a terminal disclaimer.

(21) Appl. No.: 15/244,523

(22) Filed: Aug. 23, 2016

(65) Prior Publication Data

US 2016/0362332 A1 Dec. 15, 2016

Related U.S. Application Data

(63) Continuation of application No. PCT/JP2015/054731, filed on Feb. 20, 2015.

(30) Foreign Application Priority Data

Feb. 28, 2014 (JP) .................. 2014-037827

(51) Int. Cl.
| | |
|---|---|
| C03C 17/25 | (2006.01) |
| C23C 18/12 | (2006.01) |
| C09D 183/04 | (2006.01) |
| C09D 1/00 | (2006.01) |
| C09D 5/32 | (2006.01) |
| C09D 163/00 | (2006.01) |
| C09D 183/06 | (2006.01) |
| C09D 7/40 | (2018.01) |
| C08G 77/16 | (2006.01) |
| C08G 77/00 | (2006.01) |
| C25B 1/00 | (2006.01) |

(52) U.S. Cl.
CPC ............... C03C 17/25 (2013.01); C09D 1/00 (2013.01); C09D 5/32 (2013.01); C09D 7/40 (2018.01); C09D 163/00 (2013.01); C09D 183/04 (2013.01); C09D 183/06 (2013.01); C23C 18/1212 (2013.01); C23C 18/1245 (2013.01); C23C 18/1254 (2013.01); C23C 18/1275 (2013.01); C23C 18/1283 (2013.01); C03C 2217/213 (2013.01); C03C 2218/113 (2013.01); C08G 77/16 (2013.01); C08G 77/80 (2013.01); C25B 1/00 (2013.01)

(58) Field of Classification Search
CPC .............. C03C 17/25; C03C 2217/213; C03C 2218/113; C08G 77/16; C08G 77/80; C09D 163/00; C09D 183/04; C09D 183/06; C09D 1/00; C09D 5/32; C09D 7/40; C23C 18/1212; C23C 18/1245; C23C 18/1254; C23C 18/1275; C23C 18/1283; C25B 1/00
See application file for complete search history.

(56) References Cited

U.S. PATENT DOCUMENTS

| | | | |
|---|---|---|---|
| 5,733,644 A | 3/1998 | Tanaka et al. | |
| 5,800,606 A | 9/1998 | Tanaka et al. | |
| 2012/0038976 A1 | 2/2012 | Kodaira et al. | |
| 2013/0071669 A1* | 3/2013 | Kodaira | ............... C03C 17/008 428/429 |
| 2014/0023860 A1 | 1/2014 | Kodaira et al. | |
| 2016/0046522 A1 | 2/2016 | Kodaira et al. | |
| 2016/0362332 A1* | 12/2016 | Morita | ............... C09D 183/04 |

FOREIGN PATENT DOCUMENTS

| | | |
|---|---|---|
| CA | 2 179 645 | 6/1995 |
| CN | 103443224 | 12/2013 |
| DE | 694 25 381 T2 | 3/2001 |
| EP | 0 736 488 A1 | 10/1996 |

(Continued)

OTHER PUBLICATIONS

International Search Report dated Mar. 31, 2015 in PCT/JP2015/054731, filed on Feb. 20, 2015(with English Translation).

(Continued)

Primary Examiner — Ling Siu Choi
Assistant Examiner — Gennadiy Mesh
(74) Attorney, Agent, or Firm — Oblon, McClelland, Maier & Neustadt, L.L.P.

(57) ABSTRACT

There are provide a liquid composition for forming a silicon oxide-based cured coating film by the sol-gel method, the liquid composition having excellent storage stability and being capable of forming a coating film excellent in durability, in particular, alkali resistance even after long-term storage. A liquid composition applied on a surface of a substrate and cured by heating to form a coating film, contains: a matrix component containing a hydrolyzable silicon compound whose content is 20 to 60 mass % as a $SiO_2$ content when silicon atoms contained in the matrix component are converted into $SiO_2$ to the total solid content amount in the liquid composition; a functional component containing an ultraviolet absorbent and an infrared absorbent; water; and an acid thermally decomposing at 80° C. or higher and a temperature of the heating or lower, wherein a pH increases between before and after the thermal decomposition of the acid.

20 Claims, No Drawings

(56) References Cited

FOREIGN PATENT DOCUMENTS

| EP | 0 757 079 A1 | 2/1997 |
|---|---|---|
| EP | 2 690 145 A1 | 1/2014 |
| JP | 8-143773 | 6/1996 |
| JP | 8-143819 | 6/1996 |
| JP | 2001-329217 | 11/2001 |
| JP | 2002-285087 | 10/2002 |
| JP | 3760471 | 3/2006 |
| JP | 2012-184297 | 9/2012 |
| JP | 2015/054731 | 2/2015 |
| KR | 10-0213529 | 8/1999 |
| KR | 10-2014-0009383 | 1/2014 |
| TW | 304974 | 5/1997 |
| WO | WO 95/17349 | 6/1995 |
| WO | WO 95/28445 | 10/1995 |
| WO | WO 2010/131744 A1 | 11/2010 |
| WO | WO 2012/128332 A1 | 9/2012 |

OTHER PUBLICATIONS

Written Opinion dated Mar. 31, 2015 in PCT/JP2015/054731, filed on Feb. 20, 2015.

\* cited by examiner

LIQUID COMPOSITION, GLASS ARTICLE AND METHOD OF FORMING COATING FILM

CROSS-REFERENCE TO RELATED APPLICATIONS

This application is a continuation of prior International Application No. PCT/JP2015/054731, filed on Feb. 20, 2015 which is based upon and claims the benefit of priority from Japanese Patent Application No. 2014-037827, filed on Feb. 28, 2014; the entire contents of all of which are incorporated herein by reference.

TECHNICAL FIELD

The present invention relates to a liquid composition for forming a coating film on a surface of an article such as glass, a glass article having a coating film formed using the liquid composition, and a method of forming a coating film.

BACKGROUND

Conventionally, a coating film is formed on a surface of an article of glass, resin or the like for various purposes. As the method of forming the coating film, for example, there is a known method of forming a silicon oxide-based cured coating film by the sol-gel method under mild conditions utilizing a hydrolysis and condensation reaction of a hydrolyzable silicon compound. According to this method, generally, a liquid composition containing a hydrolyzable silicon compound and a catalyst such as acid is prepared, and this is applied on the surface of the article and heated and cured to form a coating film.

A problem in such a silicon oxide-based cured coating film is that when a large amount of a tetrafunctional hydrolyzable silicon compound is used to increase the hardness, cracks and the like occur in the coating film to be obtained. In order to solve the problem, an organic compound is added as a flexibility-imparting component so as to improve the film-forming property. Further, to impart various functions, for example, ultraviolet absorbency and infrared blocking property to the coating film, organic dye or inorganic particles having these functions are often blended (refer to, for example, Patent Reference 1 (International Publication No. WO2010/131744)).

Here, the above liquid composition containing the hydrolyzable silicon compound has problems in storage stability such as polymerization of the silicon compound because hydrolysis gradually proceeds during long-term storage and the like. Hence, it is known that keeping the pH low in a state of the liquid composition improves the storage stability. In a liquid composition with a low pH, however, when containing the above various organic compounds, inorganic particles and the like, there is a problem that the durability such as alkali resistance decreases in the cured coating film obtained after long-term storage, and the problem is prominent when the curing temperature is relatively low.

SUMMARY OF THE INVENTION

The present invention has been made from the above viewpoints, and its object is to provide a liquid composition for forming a silicon oxide-based cured coating film by the sol-gel method, the liquid composition having excellent storage stability and being capable of forming a coating film excellent in durability, in particular, alkali resistance even after long-term storage. Another object of the present invention is to provide a glass article having a silicon oxide-based cured coating film formed by the sol-gel method using the liquid composition, which can be economically produced with good productivity, and an economical method of forming a coating film with good productivity.

The present invention provides a liquid composition, a glass article, and a method of forming a coating film in the following [1] to [15].

[1] A liquid composition applied on a surface of a substrate and cured by heating to form a coating film, the liquid composition including:

a matrix component (a) containing a hydrolyzable silicon compound as main component and cured by a hydrolysis and condensation reaction by the heating to form a silicon oxide matrix;

a functional component (c) imparting a predetermined function to the coating film;

water (d); and an acid (e) thermally decomposing at 80° C. or higher and a temperature of the heating or lower, wherein the content of the matrix component (a) is 20 to 60 mass % as a $SiO_2$ content when silicon atoms contained in the matrix component (a) are converted into $SiO_2$, relative to the total solid content amount in the liquid composition, the functional component (c) contains an ultraviolet absorbent (c1) and an infrared absorbent (c2), and a pH after the thermal decomposition ($pH_a$) of the acid (e) in the liquid composition is larger than a pH before the thermal decomposition ($pH_b$).

[2] The liquid composition according to [1], further comprising a film-forming component (b) improving a film-forming property of the coating film.

[3] The liquid composition according to [1], wherein the temperature of the heating is 150 to 230° C.

[4] The liquid composition according to [1], wherein the pH of the liquid composition before the acid (e) thermally decomposes ($pH_b$) is 5 or less.

[5] The liquid composition according to [1], wherein the hydrolyzable silicon compound contains a tetrafunctional alkoxysilane compound.

[6] The liquid composition according to [1], wherein the acid (e) is at least one selected from a maleic acid and a succinic acid.

[7] The liquid composition according to [2], wherein the content of the infrared absorbent (c2) is 5 to 40 parts by mass relative to 100 parts by mass of the total amount of the matrix component (a) and film-forming component (b).

[8] The liquid composition according to [2], wherein the film-forming component (b) contains polyepoxides.

[9] The liquid composition according to [1], wherein when the liquid composition stored at 23° C. for 48 hours after produced is used to form a coating film with a film thickness of 1.0 to 7.0 μm on a substrate and is immersed together with the substrate in an aqueous sodium hydroxide solution of 0.1 N at 23° C. for 2 hours, a decreased amount in film thickness after the immersion with respect to before the immersion is 0.5 μm or less.

[10] A glass article including a glass substrate and a coating film formed using the liquid composition according to [1] on a surface of at least a part of the glass substrate.

[11] The glass article according to [10], wherein a film thickness of the coating film is 1.0 to 7.0 μm.

[12] The glass article according to [10], wherein a visible light transmittance measured in accordance with JIS R3212 (1998) is 70% or more, and an ultraviolet transmittance measured in accordance with ISO-9050 (1990) is 3% or less.

[13] The glass article according to [10], wherein a solar radiation transmittance measured in accordance with JIS R3106 (1998) is 46% or less.

[14] The glass article according to [10], wherein when a 1000-rotation abrasion test with a CS-10F abrasive wheel in accordance with JIS R3212 (1998) is carried out on a surface of the coating film, an increased amount in haze after the test with respect to before the test is 5% or less.

[15] A method of forming a coating film using the liquid composition according to [1] on a surface of a substrate, the method including: applying the liquid composition to the surface to form an applied film; and curing the applied film by heating the applied film to a temperature at which the acid (e) is decomposed or higher and a temperature at which the matrix component (a) is cured.

The present invention can provide a liquid composition for forming a silicon oxide-based cured coating film by the sol-gel method, the liquid composition having excellent storage stability and being capable of forming a coating film excellent in durability, in particular, alkali resistance even after long-term storage. The present invention can also provide a glass article having a silicon oxide-based cured coating film formed by the sol-gel method using the liquid composition, which can be economically produced with good productivity, and an economical method of forming a coating film with good productivity.

MODES FOR CARRYING OUT THE INVENTION

Embodiments of the present invention will be described below. Note that the present invention should not be construed limited to the following description.

[Liquid Composition]

A liquid composition of the present invention is a liquid composition applied on a surface of a substrate and cured by heating to form a coating film, the liquid composition containing following components (a) to (e):

a matrix component (a) containing a hydrolyzable silicon compound as main component and cured by a hydrolysis and condensation reaction by the heating to form a silicon oxide matrix;

a film-forming component (b) improving a film-forming property of the coating film and/or a functional component (c) imparting a predetermined function to the coating film; water (d); and an acid (e) thermally decomposing at 80° C. or higher and a temperature of the heating or lower, wherein a pH after the thermal decomposition ($pH_a$) of the acid (e) in the liquid composition is larger than a pH before the thermal decomposition ($pH_b$).

Note that in this specification, the above components may also be described only by reference symbols, for example, the matrix component (a) as a component (a). Besides, in the following description, when mentioning pH of the liquid composition, the pH of the liquid composition before the acid (e) thermally decomposes is described as "$pH_b$", and the pH of the liquid composition after the acid (e) thermally decomposes is described as "$pH_a$" in a distinction manner when necessary.

In the liquid composition of the present invention, the above acid (e) is contained in the liquid composition and thermally decomposes at 80° C. or higher and the above heating temperature or lower, and thereby has a function to change the pH of the liquid composition from the $pH_b$ before the thermal decomposition to a higher $pH_a$ after the thermal decomposition. The liquid composition of the present invention thereby has effects described below.

For forming a coating film on a substrate using the liquid composition of the present invention, the liquid composition is first applied on the surface of a substrate to form an applied film. Further, the obtained applied film is cured by heating, whereby a coating film is obtained on the substrate. In this specification, a film made of the liquid composition of the present invention applied on the substrate is called an "applied film", and a film in a state where a curing component in the applied film is cured and film formation is completely finished is called a "coating film".

An example of the curing component in the liquid composition of the present invention is the matrix component (a) that is mainly constituted of a hydrolyzable silicon compound and cured by a hydrolysis and condensation reaction by heating to form a silicon oxide matrix. The "silicon oxide matrix" obtained by the hydrolysis and condensation of the hydrolyzable silicon compound is a highly polymerized compound which is linearly or three-dimensionally polymerized by siloxane bonding represented by —Si—O—Si—.

In the liquid composition of the present invention, keeping the $pH_b$ low by the function of the acid being the (e) component during storage as the liquid composition suppresses the hydrolysis and condensation reaction of the hydrolyzable silicon compound, thereby securing the storage stability. Even in such a liquid composition, however, the hydrolysis and condensation of the hydrolyzable silicon compound proceeds during long storage, resulting in a lowered density of hydrolyzable groups in the liquid composition. Here in the applied film formed on the substrate in such a state, generally the curing reaction does not sufficiently occur unless the hydrolyzable groups with the lowered density efficiently react in heat-curing, bringing about a problem in durability such as alkali resistance.

However, in the liquid composition of the present invention, by the heating after the formation of the applied film the acid being the (e) component decomposes to weaken the function of the acid, and therefore the curing is performed in a state where the $pH_a$ of the liquid composition in the applied film is higher than the $pH_b$ before the acid (e) thermally decomposes. In the state where the pH is higher like this, the reactivity of the hydrolyzable groups increases, so that the hydrolyzable groups sufficiently react and cure even in a low density state to form a coating film having high durability such as alkali resistance.

Hereinafter, the components will be described.

<Matrix Component (a)>

The matrix component (a) contains a hydrolyzable silicon compound as main component and cured by a hydrolysis and condensation reaction when the liquid composition is heated to form a silicon oxide matrix. In this specification, a group of silicon compounds in which at least one hydrolyzable group is bonded to a silicon atom is collectively called a "hydrolyzable silicon compound", and the "hydrolyzable silicon compound" is used as a term including an unreacted hydrolyzable silicon compound, its partially hydrolyzed condensate, and a unit of the hydrolyzable silicon compound in a partially hydrolyzed co-condensate with another hydrolyzable silicon compound unless otherwise stated. In other words, the hydrolyzable silicon compound is composed of at least one selected from an unreacted hydrolyzable silicon compound, its partially hydrolyzed condensate, and a unit of the hydrolyzable silicon compound in a partially hydrolyzed co-condensate with another hydrolyzable silicon compound. Further, in this specification, a term of a partially hydrolyzed (co-)condensate is used to collectively mean the partially hydrolyzed condensate and the partially hydrolyzed co-condensate as necessary.

The number of functionalities, such as tetrafunctionality, trifunctionality, or bifunctionality, of the hydrolyzable silicon compound refers to the number of hydrolyzable groups bonded to a silicon atom in the silicon compound. Further, the partially hydrolyzed (co-)condensates may be a compound having a hydrolyzable group and a silanol group (hydroxyl group bonded to a silicon atom), or may be a compound having only a silanol group.

In this specification, a component (ii) or material (ii) mainly constituted of or mainly containing a certain component (i) refers to a component (ii) or material (ii) having a content ratio of 50 mass % or more relative to the whole component (ii) or the whole material (ii) of the component (i). The matrix component (a) may be constituted of only the hydrolyzable silicon compound or may contain a silicon oxide component bonded to and included in the silicon oxide matrix, for example, silicon oxide particles in addition to the hydrolyzable silicon compound. The matrix component (a) is generally constituted only of the hydrolyzable silicon compound.

The hydrolyzable silicon compound contained in the matrix component (a) is more preferably being at least a part of them are partially hydrolytically (co-)condensed than is constituted only of the unreacted hydrolyzable silicon compound, namely, monomers of the hydrolyzable silicon compound, in terms of stability and uniform reactivity of the hydrolyzable silicon compound in the liquid composition. Therefore, when blending the matrix component (a) in the liquid composition, it is preferable to blend the matrix component (a) into the liquid composition as the partially hydrolyzed condensate of the hydrolyzable silicon compound (monomer) or to mix the hydrolyzable silicon compound (monomer) together with other components contained in the liquid composition, and then subject at least a part of them to partial hydrolytic condensation into the liquid composition.

For example, preferably, a tetraalkoxysilane is used, the tetraalkoxysilane, a reaction catalyst thereof, and other components constituting the liquid composition are mixed, and thereafter processing of subjecting at least a part of the tetraalkoxysilane in the mixture to hydrolytic condensation (specifically, for example, processing of stirring for a predetermined time under room temperature or while heated) is perform to prepare the liquid composition.

When two or more compounds, for example, a tetrafunctional hydrolyzable silicon compound and a trifunctional hydrolyzable silicon compound are used as the hydrolyzable silicon compound, by subjecting them to hydrolytic co-condensation in advance to produce a partially hydrolyzed co-condensate, a uniform coating film can be obtained easily when the coating film is formed from the liquid composition. Further, also when a later-described silylated ultraviolet absorbent is used, by similarly subjecting it to hydrolytic co-condensation with other hydrolyzable silicon compounds in advance, the ultraviolet absorbent can be dispersed more evenly in the silicon oxide-based matrix.

In the present invention, the matrix component (a) preferably contains at least one tetrafunctional hydrolyzable silicon compound. In this case, the liquid composition preferably further contains a later-described flexibility-imparting component as the film-forming component (b) that improves the film-forming property of the coating film. The matrix component (a) is also preferably one containing at least one each of the tetrafunctional hydrolyzable silicon compound and the trifunctional hydrolyzable silicon compound.

In a particularly preferable embodiment related to the matrix component (a), the hydrolyzable silicon compound is constituted only of at least one tetrafunctional hydrolyzable silicon compound and contained together with the flexibility-imparting component as film-forming component (b) in the liquid composition, or constituted of at least one each of the tetrafunctional hydrolyzable silicon compound and the trifunctional hydrolyzable silicon compound and contained in the liquid composition together with the flexibility-imparting component as the film-forming component (b).

Specific examples of the hydrolyzable group which the hydrolyzable silicon compound has include an alkoxy group (including a substituted alkoxy group such as an alkoxy-substituted alkoxy group), an alkenyloxy group, an acyl group, an acyloxy group, an oxime group, an amide group, an amino group, an iminoxy group, an aminoxy group, an alkyl-substituted amino group, an isocyanate group, a chlorine atom, and the like. Preferable hydrolyzable groups among them are organooxy groups such as an alkoxy group, an alkenyloxy group, an acyloxy group, an iminoxy group, and an aminoxy group, and an alkoxy group is particularly preferable. Preferable alkoxy groups are an alkoxy group having 4 or less carbon atoms and an alkoxy-substituted alkoxy group having 4 or less carbon atoms (such as a 2-methoxyethoxy group), and a methoxy group and an ethoxy group are particularly preferable.

The tetrafunctional hydrolyzable silicon compound is a compound in which four hydrolyzable groups are bonded to a silicon atom. The four hydrolyzable groups may be the same as or different from each other. The hydrolyzable groups are preferably an alkoxy group, more preferably an alkoxy group having 4 or less carbon atoms, furthermore preferably a methoxy group and an ethoxy group. Specific examples include a tetramethoxysilane, a tetraethoxysilane, a tetra-n-propoxysilane, a tetra-n-butoxysilane, a tetra-sec-butoxysilane, a tetra-tert-butoxysilane, and the like. In the present invention, a tetraethoxysilane, a tetramethoxysilane, and the like are preferably used. They may be used alone or two or more of them may be used in combination.

The trifunctional hydrolyzable silicon compound is a compound in which three hydrolyzable groups and one non-hydrolyzable group are bonded to a silicon atom. The three hydrolyzable groups may be the same as or different from each other. The hydrolyzable group is preferably an alkoxy group, more preferably an alkoxy group having 4 or less carbon atoms, and furthermore preferably a methoxy group or an ethoxy group.

The non-hydrolyzable group is preferably a non-hydrolyzable monovalent organic group having a functional group or having no functional group, and more preferably a non-hydrolyzable monovalent organic group having a functional group. The non-hydrolyzable monovalent organic group refers to an organic group in which the organic group and a silicon atom are bonded with a carbon-silicon bond and a bond terminal atom is a carbon atom.

Here, the functional group used in this specification is a term comprehensively indicating a group having reactivity, which is distinguished from a mere substituent group, and this term does not include, for example, a non-reactive group such as a saturated hydrocarbon group. Further, an addition-polymerizable unsaturated double bond (ethylenic double bond) not related to formation of a main chain of a high-molecular compound, such as one having a monomer in its side chain, is assumed as one type of the functional group.

Further, the term "(meth)acryl . . ." such as a (meth)acrylic ester used in this specification means both "acrylic . . ." and "methacrylic . . .".

Among the above non-hydrolyzable monovalent organic groups, the non-hydrolyzable monovalent organic group having no functional group is preferably a hydrocarbon group having no addition-polymerizable unsaturated double bond such as an alkyl group or an aryl group, or a halogenated hydrocarbon group having no addition-polymerizable unsaturated double bond such as a halogenated alkyl group. The number of carbon atoms of the non-hydrolyzable monovalent organic group having no functional group is preferably 20 or less, and more preferably 10 or less. This monovalent organic group is preferably an alkyl group having 4 or less carbon atoms.

Specific examples of the trifunctional hydrolyzable silicon compound having a non-hydrolyzable monovalent organic group having no functional group include methyltrimethoxysilane, methyltriethoxysilane, methyltris(2-methoxyethoxy)silane, methyltriacetoxysilane, methyltripropoxysilane, methyltriisopropenoxysilane, methyltributoxysilane, ethyltrimethoxysilane, ethyltriethoxysilane, phenyltrimethoxysilane, phenyltriethoxysilane, phenyltriacetoxysilane, and the like. They may be used alone or two or more of them may be used in combination.

Examples of the functional group in the non-hydrolyzable monovalent organic group having a functional group include an epoxy group, a (meth)acryloxy group, a primary or secondary amino group, an oxetanyl group, a vinyl group, a styryl group, a ureido group, a mercapto group, an isocyanate group, a cyano group, a halogen atom, and the like. Preferable examples are an epoxy group, a (meth)acryloxy group, a primary or secondary amino group, an oxetanyl group, a vinyl group, a ureido group, a mercapto group, and the like. Particularly preferable examples are an epoxy group, a primary or secondary amino group, and a (meth)acryloxy group. The monovalent organic group having an epoxy group is preferably a monovalent organic group having a glycidoxy group or a 3,4-epoxycyclohexyl group, and the organic group having a primary or secondary amino group is preferably a monovalent organic group having an amino group, a monoalkylamino group, a phenylamino group, an N-(aminoalkyl)amino group, or the like.

Two or more functional groups in the monovalent organic group may exist, and excluding the case of a primary or secondary amino group, a monovalent organic group having one functional group is preferable. In the case of a primary or secondary amino group, the monovalent organic group may have two or more amino groups, and in this case, a monovalent organic group having one primary amino group and one secondary amino group, for example, an N-(2-aminoethyl)-3-aminopropyl group and a 3-ureidopropyl group are preferable. The total number of carbon atoms of these monovalent organic groups having a functional group is preferably 20 or less, and more preferably 10 or less.

Specific examples of the trifunctional hydrolyzable silicon compound having a non-hydrolyzable monovalent organic group having a functional group include the following compounds. The compounds are vinyltrimethoxysilane, vinyltriethoxysilane, vinyltriacetoxysilane, vinyltris(2-methoxyethoxy)silane, vinyltriisopropenoxysilane, p-styryltrimethoxysilane, 3-glycidoxypropyltrimethoxysilane, 3-glycidoxypropyltriethoxysilane, 5,6-epoxyhexyltrimethoxysilane, 9,10-epoxydecyltrimethoxysilane, 2-(3,4-epoxycyclohexyl)ethyltrimethoxysilane, 2-(3,4-epoxycyclohexyl)ethyltriethoxysilane, N-(2-aminoethyl)-3-aminopropyltrimethoxysilane, N-(2-aminoethyl)-3-aminopropyltriethoxysilane, 3-aminopropyltrimethoxysilane, 3-aminopropyltriethoxysilane, 3-ureidopropyltriethoxysilane, 3-methacryloxypropyltrimethoxysilane, 3-methacryloxypropyltriethoxysilane, 3-acryloxypropyltrimethoxysilane, di-(3-methacryloxy)propyltriethoxysilane, 3-isocyanatepropyltriethoxysilane, 3-chloropropyltrimethoxysilane, 3-chloropropyltriethoxysilane, 3-chloropropyltripropoxysilane, 3,3,3-trifluoropropyltrimethoxysilane, 3-mercaptopropyltrimethoxysilane, 3-mercaptopropyltriethoxysilane, 2-cyanoethyltrimethoxysilane, and the like.

A preferable compound among them is a trifunctional hydrolyzable silicon compound in which one monovalent organic group having at a terminal of an alkyl group having 2 or 3 carbon atoms, a functional group of one of a glycidoxy group, a 3,4-epoxycyclohexyl group, an amino group, an alkylamino group (the number of carbon atoms of the alkyl group is 4 or less), a phenylamino group, an N-(aminoalkyl) amino group (the number of carbon atoms of the alkyl group is 4 or less), and a (meth)acryloxy group, and three alkoxy groups having 4 or less carbon atoms are bonded to a silicon atom.

Specific examples of such a compound include 3-glycidoxypropyltrimethoxysilane, 3-glycidoxypropyltriethoxysilane, 2-(3,4-epoxycyclohexyl)ethyltrimethoxysilane, 2-(3,4-epoxycyclohexyl)ethyltriethoxysilane, 3-methacryloxypropyltrimethoxysilane, di-(3-methacryloxy)propyltriethoxysilane, and the like. Particularly preferable examples in view of the reactivity with the silicon compound are 3-glycidoxypropyltrimethoxysilane, 3-glycidoxypropyltriethoxysilane, 2-(3,4-epoxycyclohexyl)ethyltrimethoxysilane or 2-(3,4-epoxycyclohexyl)ethyltriethoxysilane, and the like. They may be used alone or two or more of them may be used in combination.

The matrix component (a) may contain a bifunctional hydrolyzable silicon compound as necessary. The bifunctional hydrolyzable silicon compound is a compound in which two hydrolyzable groups and two non-hydrolyzable groups are bonded to a silicon atom. The two hydrolyzable groups may be the same or different from each other. The hydrolyzable group is preferably an alkoxy group, more preferably an alkoxy group having 4 or less carbon atoms, and furthermore preferably a methoxy group or an ethoxy group.

The non-hydrolyzable group is preferably a non-hydrolyzable monovalent organic group. The non-hydrolyzable monovalent organic group may have a functional group same as that of the trifunctional hydrolyzable silicon compound as necessary.

Specific examples of the bifunctional hydrolyzable silicon compound include dimethyldimethoxysilane, dimethyldiethoxysilane, dimethyldi(2-methoxyethoxy)silane, dimethyldiacetoxysilane, dimethyldipropoxysilane, dimethyldiisopropenoxysilane, dimethyldibutoxysilane, vinylmethyldimethoxysilane, vinylmethyldiethoxysilane, vinylmethyldiacetoxysilane, vinylmethyldi(2-methoxyethoxy)silane, vinylmethyldiisopropenoxysilane, phenylmethyldimethoxysilane, phenylmethyldiethoxysilane, phenylmethyldiacetoxysilane, 3-chloropropylmethyldimethoxysilane, 3-chloropropylmethyldiethoxysilane, 3-chloropropylmethyldipropoxysilane, 3,3,3-trifluoropropylmethyldimethoxysilane, 3-methacryloxypropylmethyldimethoxysilane, 3-acryloxypropylmethyldimethoxysilane, 3-aminopropylmethyldimethoxysilane, 3-aminopropylmethyldiethoxysilane, 3-mercaptopropylmethyldimethoxysilane, 3-mercaptopropylmethyldiethoxysilane, N-(2-aminoethyl)-3-aminopropylmethyldimethoxysilane, 2-cyanoethylmethyldimethoxysilane, and the like. They may be used alone or two or more of them may be used in combination.

Further, in the matrix component (a), the tetrafunctional hydrolyzable silicon compound, the trifunctional hydrolyzable silicon compound, and the bifunctional hydrolyzable silicon compound may be contained in the liquid composition as they are, or may each be contained as a partially hydrolyzed condensate, or may be contained as a partially hydrolyzed co-condensate of two or more of them.

The partially hydrolyzed (co-)condensate is an origomer (multimer) produced by hydrolysis of the hydrolyzable silicon compound and then dehydration condensation thereof. The partially hydrolyzed (co-)condensate is generally a polymer of a degree that dissolves in a solvent. The partially hydrolyzed (co-)condensate has a hydrolyzable group or a silanol group, and has a nature to undergo further hydrolytic (co-)condensation to become a final cured product. Only from one type of hydrolyzable silicon compound, the partially hydrolyzed condensate can be obtained, or from two or more types of hydrolyzable silicon compounds, the partially hydrolyzed co-condensate as their co-condensate can be obtained.

The partially hydrolytic (co-)condensation of the hydrolyzable silicon compound can be performed, for example, by stirring a reaction liquid obtained by adding water to a lower alcohol solution of the hydrolyzable silicon compound at 10 to 70° C. for 1 to 48 hours under existence of an acid catalyst. Note that specific examples of the acid catalyst used for the reaction include: inorganic acids such as nitric acid, hydrochloric acid, sulfuric acid, and phosphoric acid; carboxylic acids such as formic acid, acetic acid, propionic acid, glycolic acid, oxalic acid, malonic acid, succinic acid, maleic acid, phthalic acid, citric acid, malic acid, and glutaric acid; sulfonic acids such as methanesulfonic acid, and the like.

The acid used as a catalyst in the above reaction here is generally blended in the liquid composition, together with the hydrolyzable silicon compound and its partially hydrolyzed (co-)condensate. Therefore, the acid used as the acid catalyst in the partial hydrolytic (co-)condensation is preferably the acid (e) that thermally decomposes at 80° C. or higher and equal to or lower than the heating temperature for curing the curing component in the liquid composition when forming a coating film and can make the $pH_a$ of the liquid composition after the thermal decomposition larger than the $pH_b$ before the thermal decomposition. Specific preferable examples include maleic acid, succinic acid, glutaric acid, phthalic acid and the like. The combination of the acid (e) and the reaction temperature of the partial hydrolytic (co-)condensation is adjusted so that the thermal decomposition temperature of the acid (e) in use becomes equal to or lower than the reaction temperature in the partial hydrolytic (co-)condensation. If the adjustment is difficult, a method may be employed which performs the partial hydrolytic (co-)condensation using an acid other than the acid (e) and then blends the acid (e) in the liquid composition.

The addition amount of the acid can be set without any particular limitation within a range where the acid can serve the function as a catalyst. A specific example of the addition amount of the acid is an amount of about 0.001 to 3.0 mole/L as the amount relative to the volume of the reaction solution containing the hydrolyzable silicon compound.

Note that the tetrafunctional hydrolyzable silicon compound, the trifunctional hydrolyzable silicon compound, and the bifunctional hydrolyzable silicon compound can be distinguished from each other as units which finally constitute the silicon oxide matrix, regardless of in which of the above states they are contained in the liquid composition.

The hydrolyzable silicon compound in the matrix component (a) is, as described above, preferably (1) constituted only of the tetrafunctional hydrolyzable silicon compound, or (2) constituted of the tetrafunctional hydrolyzable silicon compound and the trifunctional hydrolyzable silicon compound. Note that in the case of (1), the liquid composition preferably further contains a flexibility-imparting component as the film-forming component (b) in order to acquire sufficient crack resistance while securing a certain thickness of a coating film to be obtained. Besides, in the case of (2), the content ratio between the tetrafunctional hydrolyzable silicon compound and the trifunctional hydrolyzable silicon compound is preferably 30/70 to 95/5, more preferably 40/60 to 90/10, and particularly preferably 50/50 to 85/15 in a mass ratio as the tetrafunctional hydrolyzable silicon compound/the trifunctional hydrolyzable silicon compound.

Further, the bifunctional hydrolyzable silicon compound is used optionally as necessary in (1) or (2). Its content is preferably 30 mass % or less by mass % relative to the whole amount of the hydrolyzable silicon compound.

The matrix component (a) is generally constituted only of the hydrolyzable silicon compound, but may contain as necessary a silicon oxide component bonded to and included in the silicon oxide matrix, for example, silicon oxide particles as a component other than the hydrolyzable silicon compound. Depending on the composition, the silicon oxide particles contained can improve the abrasion resistance of the coating film.

In the case where the silicon oxide particles are optionally blended as the matrix component (a) in the liquid composition, the silicon oxide particles are preferably blended as colloidal silica. Note that the colloidal silica refers to the silicon oxide particles dispersed in water or an organic solvent such as methanol, ethanol, isobutanol, propylene glycol monomethyl ether or the like. By appropriately blending the colloidal silica when preparing the liquid composition of the present invention, a liquid composition containing the silicon oxide particles can be produced. Besides, when producing the partially hydrolyzed (co-)condensate of the hydrolyzable silicon compound, a partially hydrolyzed (co-)condensate containing the silicon oxide particles can be obtained by blending the colloidal silica in the hydrolyzable silicon compound being the raw material and subjecting the blend to partial hydrolytic (co-)condensation, and can be used to prepare the liquid composition of the present invention containing the silicon oxide particles.

The silicon oxide particles optionally contained in the matrix component (a) have preferably an average particle diameter (BET method) of 1 to 100 nm. An average particle diameter of more than 100 nm may be undesirable in terms of optical quality because the particles diffusely reflect light to increase the value of haze of the coating film to be obtained. The average particle diameter is particularly preferably 5 to 40 nm. This is for keeping the transparency of the coating film while imparting the abrasion resistance to the coating film. Besides, both of water-dispersion type and organic solvent-dispersion type of colloidal silica can be used, and the organic solvent-dispersion type is preferably used. In the case of using the water-dispersion type, it is preferable to use colloidal silica in which the silicon oxide particles are dispersed in an acidic aqueous solution.

When the matrix component (a) contains the silicon oxide particles, its content is preferably an amount of 5 o 50 parts by mass and more preferably 10 o 30 parts by mass relative to 100 parts by mass being the whole amount of the hydrolyzable silicon compound. The above range of the content is a range of the content of the silicon oxide particles capable of keeping the film-forming property of the coating film and preventing occurrence of cracks and a decrease in transparency of the coating film due to aggregation of the silicon oxide particles while securing sufficient abrasion resistance in the coating film formed using the liquid composition of the present invention.

The hydrolyzable silicon compound contained in the matrix component (a) is preferably set to be cured at a temperature higher than the upper limit of the normal storage temperature, preferably 80° C. or higher. The upper limit of the curing temperature is preferable 230° C. from the economical viewpoint. The curing temperature of the matrix component (a) is more preferably 150 to 230° C. and particularly preferably 180 to 230° C.

The content of the matrix component (a) in the liquid composition is preferably 10 to 90 mass %, and more preferably 20 to 60 mass % as a $SiO_2$ content when silicon atoms contained in the matrix component (a) are converted into $SiO_2$, relative to the total solid content amount in the composition. Hereinafter, the content of the matrix component (a) in the liquid composition is indicated by the $SiO_2$ content when silicon atoms contained in the matrix component (a) are converted into $SiO_2$ unless otherwise stated.

Here, in this specification, the total solid content refers to a coating film forming component among components contained in the liquid composition, and indicates all the components other than volatile components which evaporate due to heating or the like in a coating film forming process, such as the water (d), the acid (e), the organic solvent and so on.

Further, the content of the matrix component (a) in the liquid composition is preferably 1 to 20 mass %, and more preferably 1 to 10 mass % as a $SiO_2$ content when converted into $SiO_2$, relative to the whole amount of the composition. When the content of the matrix component (a) relative to the whole amount of the liquid composition is less than 1 mass %, it is necessary to increase the application amount of the liquid composition for obtaining a coating film having a desired thickness, and consequently an exterior appearance may be deteriorated. When the content is more than 20 mass %, the thickness of the applied film in a state where the liquid composition is applied becomes large, and may cause cracks in the coating film to be obtained and may deteriorate the storage stability of the liquid composition.

<Film-forming Component (b)>

The liquid composition of the present invention contains the film-forming component (b) that improves the film-forming property of the coating film to be obtained and/or the functional component (c) that imparts a predetermined function to the coating film to be obtained. The liquid composition of the present invention solves the problem in resistance to alkali when the coating film formed of the conventional liquid composition containing the film-forming component (b) and/or the functional component (c) in addition to the matrix component (a) is formed of the liquid composition after long storage, by using the acid (e) having later-described specific properties.

Specific examples of the film-forming component (b) include a flexibility-imparting component that imparts flexibility to the silicon oxide matrix. The flexibility-imparting component contained can contribute to prevention of occurrence of cracks in the coating film to be obtained from the liquid composition.

Note that although blending of the flexibility-imparting component is effective regardless of what constitution the matrix component (a) has, particularly the silicon oxide matrix formed only of the tetrafunctional hydrolyzable silicon compound may be insufficient in flexibility. Even in such a case, when the liquid composition contains the tetrafunctional hydrolyzable silicon compound and the flexibility-imparting component, a coating film excellent in both mechanical strength and crack resistance can be produced easily.

Examples of the flexibility-imparting component include various organic resins such as a silicone resin, an acrylic resin, a polyester resin, a polyurethane resin, a hydrophilic organic resin containing a polyoxyalkylene group, and an epoxy resin, and organic compounds such as glycerin.

When the organic resin is used as the flexibility-imparting component, its form is preferably liquid, particle, or the like. The organic resin may also be a curable resin which is cured with curing of the matrix component (a) due to heating when forming the coating film using the liquid composition containing the organic resin. In this case, within a range not impairing the characteristics of the silicon oxide-based matrix, a part of the matrix component (a) and the curable resin being the flexibility-imparting component may partially be reacted and crosslinked.

Preferable examples of the silicone resin among the flexibility-imparting component include a silicone oil including various modified silicone oils, a silicone rubber in which a diorganosilicone having a terminal containing a hydrolyzable silyl group or an organic group containing a polymerizable group is partially or entirely crosslinked, or the like.

Preferable examples of the hydrophilic organic resin containing a polyoxyalkylene group include polyethylene glycol (PEG), a polyether phosphate ester-based polymer, and the like.

Preferable example of the polyurethane resin include a polyurethane rubber and the like, and preferable examples of the acrylic resin include an acrylonitrile rubber, a homopolymer of an acrylic acid alkyl ester, a homopolymer of a methacrylic acid alkyl ester, a copolymer of an acrylic acid alkyl ester and a monomer copolymerizable with the acrylic acid alkyl ester, a copolymer of a methacrylic acid alkyl ester and a monomer copolymerizable with the methacrylic acid alkyl ester, and the like. Usable monomer copolymerizable with the (meth)acrylic acid alkyl ester are a hydroxyalkyl ester of (meth)acrylic acid, a (meth)acrylic acid ester having a polyoxyalkylene group, a (meth)acrylic acid ester having a partial structure of the ultraviolet absorbent, a (meth)acrylic acid ester having a silicon atom, and the like.

When the epoxy resin is used as the flexibility-imparting component, it is preferable to use polyepoxides and a curing agent in combination, or polyepoxides alone. Polyepoxides are a general term of compounds having plural epoxy groups. More specifically, the average number of epoxy groups of polyepoxides is 2 or more, and polyepoxides having an average number of epoxy groups of 2 to 10 are preferable in the present invention.

Preferable examples of such polyepoxides are polyglycidyl compounds such as a polyglycidyl ether compound, a polyglycidyl ester compound, and a polyglycidyl amine compound. Further, the polyepoxides may be either aliphatic polyepoxides or aromatic polyepoxides, and aliphatic polyepoxides are preferable.

Among them, a polyglycidyl ether compound is preferable, and an aliphatic polyglycidyl ether compound is particularly preferable. The polyglycidyl ether compound is preferably a glycidyl ether of a bifunctional or higher alcohol, and is particularly preferably a glycidyl ether of a trifunctional or higher alcohol because light resistance can be improved. Note that such an alcohol is preferably an aliphatic alcohol, an alicyclic alcohol, or a sugar alcohol.

Specific examples include an ethylene glycol diglycidyl ether, a polyethylene glycol diglycidyl ether, a propylene glycol diglycidyl ether, a polypropylene glycol diglycidyl ether, a neopentyl glycol diglycidyl ether, a glycerol polyglycidyl ether, a diglycerol polyglycidyl ether, a polyglycerol polyglycidyl ether, a trimethylolpropane polyglycidyl ether, a sorbitol polyglycidyl ether, a pentaerythritol polyglycidyl ether, and the like. Only one of them may be used, or two or more of them may be used in combination.

Among them, polyglycidyl ethers of an aliphatic polyol having three or more hydroxyl groups (one in which an average number of glycidyl groups (epoxy groups) per one molecule is more than 2), such as a glycerol polyglycidyl ether, a diglycerol polyglycidyl ether, a polyglycerol polyglycidyl ether, and a sorbitol polyglycidyl ether, are particularly preferable because the light resistance can be improved. They may be used alone or two or more of them may be used in combination.

In the present invention, among the flexibility-imparting components, an epoxy resin, particularly, polyepoxides, PEG, glycerin, and the like are preferable because sufficient flexibility can be imparted to the coating film to be obtained while the mechanical strength is maintained. Further, the epoxy resin, particularly, polyepoxides, PEG, glycerin, and the like have, in addition to a function to prevent the occurrence of cracks caused by light irradiation for a long term, a function to prevent a decrease in the function of the coating film to which the various functions are imparted by the functional component (c), while securing colorless transparency of the coating film to be obtained. Note that in the present invention, among them, the polyepoxides are particularly preferable.

The content of the flexibility-imparting component as the (b) component in the liquid composition is not particularly limited as long as it is an amount capable of imparting flexibility to the coating film to be obtained and improving the crack resistance without impairing the effects of the present invention. And, it is preferably 0.1 to 100 parts by mass, and more preferably 1.0 to 50 parts by mass relative to 100 parts by mass of the matrix component (a).

Also in the case of using, as the film-forming component (b), a film-forming component other than the flexibility-imparting component, its content is set to an amount capable of improving the film-forming property of the coating film to be obtained without impairing the effects of the present invention.

<Functional Component (c)>

The functional component (c) that may be contained in the liquid composition of the present invention is not particularly limited as long as it can impart a specific function to the coating film to be obtained, and can be appropriately selected according to the application. When the liquid composition contains the functional component (c), one kind may be used alone, or two or more kinds may be used in combination in a range not impairing their effects to each other. Examples of the functional component (c) include materials that absorb light with a specific wavelength, such as an ultraviolet absorbent (c1), an infrared absorbent (c2) and the like.

<Ultraviolet Absorbent (c1)>

The ultraviolet absorbent (c1) is not particularly limited as long as it is a compound that has a function to absorb light in an ultraviolet wavelength region. Specific example of the ultraviolet absorbent (c1) is one or more selected from a benzophenone-based compound, a triazine-based compound, and a benzotriazole-based compound.

Specific examples of the benzotriazole-based compound include 2-[5-chloro(2H)-benzotriazole-2-yl]-4-methyl-6-(tert-butyl) phenol (as a commercial product, TINUVIN 326 (product name, produced by Ciba Japan), or the like)); octyl-3-[3-tert-4-hydroxy-5-[5-chloro-2H-benzotriazole-2-yl]propionate; 2-(2H-benzotriazole-2-yl)-4,6-di-tert-pentyl-phenol; 2-(2-hydroxy-5-methylphenyl)benzotriazole; 2-[2-hydroxy-3-(3,4,5,6-tetrahydrophthalimide-methyl)-5-methylphenyl]benzotriazole; 2-(2-hydroxy-5-tert-octylphenyl)-benzotriazole; 2-(2-hydroxy-5-tert-butylphenyl)-2H-benzotriazole; methyl 3-(3-(2H-benzotriazole-2-yl)-5-tert-butyl-4-hydroxyphenyl) propionate; 2-(2H-benzotiazol-2-yl)-4,6-bis(1-methyl-1-phenylethyl)phenol; 2-(2H-benzotriazole-2-yl)-6-(1-methyl-1-phenylethyl)-4-(1,1,3,3-tetramethylbutyl)phenol; and the like. Among them, preferably, 2-[5-chloro(2H)-benzotriazole-2-yl]-4-methyl-6-(tert-butyl)phenol is used.

Specific examples of the triazine-based compound include 2-[4-[(2-hydroxy-3-dodecyloxypropyl)oxy]-2-hydroxyphenyl]-4,6-bis(2,4-dimethylphenyl)-1,3,5-triazine; 2-[4-[(2-hydroxy-3-(2'-ethyl)hexyl)oxy]-2-hydroxyphenyl]-4,6-bis(2,4-dimethylphenyl)-1,3,5-triazine; 2,4-bis(2-hydroxy-4-butoxyphenyl)-6-(2,4-bis-butoxyphenyl)-1,3,5-triazine; 2-(2-hydroxy-4-[1-octylcarbonylethoxy]phenyl)-4,6-bis(4-phenylphenyl)-1,3,5-triazine; TINUVIN 477 (product name, produced by Ciba Japan); and the like. Among them, 2-(2-hydroxy-4-[1-octylcarbonylethoxy]phenyl)-4,6-bis(4-phenylphenyl)-1,3,5-triazine is preferably used.

Specific examples of the benzophenone-based ultraviolet compound include 2,4-dihydroxybenzophenone; 2,2',3(or one of 4,5,6)-trihydroxybenzophenone, 2,2',4,4'-tetrahydroxybenzophenone; 2,4-dihydroxy-2',4'-dimethoxybenzophenone; 2-hydroxy-4-n-octoxybenzophenone; and the like. Among them, 2,2',4,4'-tetrahydroxybenzophenone is preferably used.

In the present invention, one of these compounds can be used alone, or two or more of them can be used in combination as the ultraviolet absorbent (c1). Further, in the liquid composition, the hydroxyl group-containing benzophenone-based compound is used preferably among the above exemplified compounds since its solubility to solvent is high and its absorption wavelength band is in a desired range. Moreover, an ultraviolet-absorbing material other than them may be used as the ultraviolet absorbent (c1) in combination with at least one or more selected from the benzophenone-based compound, the triazine-based compound, and the benzotriazole-based compound as necessary within a range not impairing the effects of the present invention.

The ultraviolet absorbent (c1) is preferably a compound that dissolves in a later-described organic solvent which the liquid composition generally contains. When an ultraviolet absorbing material that is not or less soluble in the organic solvent is used as the ultraviolet absorbent (c1), it is preferable to disperse the ultraviolet absorbent (c1) as particles in a dispersion medium to prepare a dispersion liquid, and the dispersion liquid is contained in the liquid composition. Further, in order to improve dispersibility in a coating film of the particles of the ultraviolet absorbent (c1), the dispersion liquid in which the particles of the ultraviolet absorbent (c1) are dispersed is preferably a dispersion liquid in which they are dispersed using a dispersing agent.

Note that the dispersion medium in the dispersion liquid of the ultraviolet absorbent (c1) particles consequently constitutes, in a composition to be obtained, a part of the organic solvent contained in the composition, and it is thus preferable to use a compound similar to a later-described organic solvent or having compatibility with the organic solvent, as the dispersion medium.

The content of the ultraviolet absorbent (c1) in the liquid composition is preferably 1 to 200 parts by mass, more preferably 5 to 180 parts by mass, and particularly preferably 15 to 150 parts by mass relative to 100 parts by mass relative to the total amount of the matrix component (a) and the film-forming component (b) from the point that a coating film to be obtained has sufficient ultraviolet absorptivity and the mechanical strength of the coating film is secured.

Note that in the liquid composition, in order to prevent bleedout of the ultraviolet absorbent (c1) from the coating film to be obtained, it is possible to constitute the ultraviolet absorbent (c1) as follows as necessary. More specifically, when the liquid composition contains the matrix component (a) or the film-forming component (b) having a reactive group, a functional group having reactivity with the reactive group which the matrix component (a) and/or the film-forming component (b) has may be introduced into the ultraviolet absorbent (c1). Here, the compound used for this introduction is assumed as a part of the matrix component (a) or the film-forming component (b) when the content of the ultraviolet absorbent (c1) in the liquid composition is calculated.

A preferable functional group introduced into the ultraviolet absorbent (c1) is a functional group having reactivity with the hydrolyzable group which the hydrolyzable silicon compound contained in the matrix component (a) has, for example, a silyl group having a hydrolyzable group. Specifically, at least one selected from the compounds containing a silyl group having a hydrolyzable group, which is obtained by introducing a silyl group having a hydrolyzable group by respective appropriate methods into the benzophenone-based compound, the triazine-based compound, and the benzotriazole-based compound, can be contained as the ultraviolet absorbent (c1) in the liquid composition. Note that the ultraviolet absorbent constituted of the above compound containing a silyl group having a hydrolyzable group will be hereinafter referred to as a silylated ultraviolet absorbent.

It is also possible to use as the ultraviolet absorbent (c1) a reaction product of a hydroxyl group-containing benzophenone-based compound preferably used in the present invention and a hydrolyzable silicon compound containing a group having reactivity with the hydroxyl group, for example, an epoxy group (hereinafter also referred to as a "silylated benzophenone-based compound"). When the silylated benzophenone-based compound as the (c) component is contained in the liquid composition together with the hydrolyzable silicon compound as the (a) component, they co-cross-link with each other by hydrolysis reaction to form a silicon oxide matrix. This fixes a hydroxyl group-containing benzophenone-based compound residue derived from the silylated benzophenone-based compound, to the silicon oxide-based matrix, thereby preventing the bleedout. As a result, the coating film obtained can keep the ultraviolet absorptivity for a long term.

The silylated ultraviolet absorbent will be described below using the silylated benzophenone-based compound as an example.

As the benzophenone-based compound having a hydroxyl group as a raw material of the silylated benzophenone-based compound, a benzophenone compound having two to four hydroxyl groups represented by the following general formula (1) is preferably used from the point that it has excellent ultraviolet absorptivity even after silylation. In particular, from the point of the absorptivity of ultraviolet rays with a long wavelength up to 380 nm, the number of hydroxyl groups which the hydroxyl group-containing benzophenone-based compound has is more preferably 3 or 4.

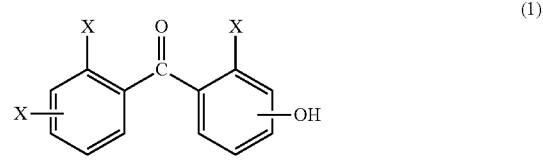

(1)

(In the formula (1), Xs represent hydrogen atoms or hydroxyl groups which may be the same as or different from each other, and at least one of them is a hydroxyl group.)

Moreover, among the benzophenone-based compounds having a hydroxyl group represented by the above general formula (1), 2,4-dihydroxybenzophenone; 2,2',3(or one of 4,5,6)-trihydroxybenzophenone; 2,2',4,4'-tetrahydroxybenzophenone; and the like are more preferable, and 2,2',4,4'-tetrahydroxybenzophenone is particularly preferable. In the reaction to silylate the benzophenone-based compound having a hydroxyl group, one of hydroxyl group-containing benzophenone-based compounds can be used alone, or two or more of them can be used as a mixture.

Examples of the hydrolyzable silicon compound containing a group having reactivity with a hydroxyl group, particularly a hydrolyzable silicon compound containing an epoxy group, which is used for reaction to silylate such a hydroxyl group-containing benzophenone-based compound include trifunctional or bifunctional hydrolyzable silicon compounds in which a non-hydrolyzable monovalent organic group having an epoxy group is bonded to a silicon atom. Preferable examples include 3-glycidoxypropyltrimethoxysilane, 3-glycidoxypropylmethyldimethoxysilane, 3-glycidoxypropyltriethoxysilane, 3-glycidoxypropylmethyldiethoxysilane, 2-(3,4-epoxycyclohexyl)ethyltrimethoxysilane, 2-(3,4-epoxycyclohexyl)ethylmethyldimethoxysilane, 2-(3,4-epoxycyclohexyl)ethyltriethoxysilane, and 2-(3,4-epoxycyclohexyl)ethylmethyldiethoxysilane, and the like.

Among them, in the present invention, 3-glycidoxypropyltrimethoxysilane, 2-(3,4-epoxycyclohexyl)ethyltrimethoxysilane, 3-glycidoxypropylmethyldimethoxysilane, 2-(3,4-epoxycyclohexyl)ethylmethyldimethoxysilane, and the like are particularly preferably used as the epoxy group-containing hydrolyzable silicon compound from the viewpoint that solubility to the liquid composition can be increased or the like. Note that in the reaction to silylate the hydroxyl group-containing benzophenone-based compound, one of the epoxy group-containing hydrolyzable silicon compounds can be used alone, or two or more of them can be used as a mixture.

As the method of obtaining the reaction product of the hydroxyl group-containing benzophenone-based compound and the epoxy group-containing hydrolyzable silicon compound, an ordinary method related to silylation reaction is applicable without particular limitation. Its specific example is the following method.

At least one of the hydroxyl group-containing benzophenone-based compounds and at least one of the epoxy group-containing hydrolyzable silicon compounds are brought into reaction under existence of a catalyst as necessary. The amount of the epoxy group-containing hydrolyzable silicon compound used in the reaction is not particularly limited, and is preferably 0.5 to 5.0 moles, and more preferably 1.0 to 3.0 moles relative to 1 mole of the hydroxyl group-containing benzophenone-based compound. If the amount of the epoxy group-containing hydrolyzable silicon compound relative to 1 mole of the hydroxyl group-containing benzophenone-based compound is less than 0.5 moles, bleedout may occur when it is added to the liquid composition, due to a large amount of un-silylated hydroxyl group-containing benzophenone-based compound existing in the coating film. Further, the mechanical durability as a coating film may no longer be maintained. Alternatively, if the amount of the epoxy group-containing hydrolyzable silicon compound relative to 1 mole of the hydroxyl group-containing benzophenone-based compound is more than 5.0 moles, the absolute amount of the hydroxyl group-containing benzophenone-based compound related to ultraviolet absorption becomes small and may decrease the ultraviolet absorbency.

A preferable example of the catalyst used for the silylation reaction is a quaternary ammonium salt as described in Japanese Patent Application Laid-open No. S58-10591. Examples of the quaternary ammonium salt include tetramethylammonium chloride, tetraethylammonium chloride, benzyltrimethylammonium chloride, benzyltriethylammonium chloride, and the like.

The addition amount of the catalyst to the reaction system is not limited in particular, and is preferably an addition amount of 0.005 to 10 parts by mass and more preferably an addition amount of 0.01 to 5 parts by mass, relative to 100 parts by mass in total of the hydroxyl group-containing benzophenone-based compound and the epoxy group-containing hydrolyzable silicon compound. When the addition amount of the catalyst relative to 100 parts by mass in total of the hydroxyl group-containing benzophenone-based compound and the epoxy group-containing hydrolyzable silicon compound is less than 0.005 parts by mass, the reaction takes long time, or when it is more than 10 parts by mass, the catalyst may lower the stability of the liquid composition when the reaction product is added to the composition.

The above silylation reaction can be carried out by heating a mixture of the hydroxyl group-containing benzophenone-based compound and the epoxy group-containing hydrolyzable silicon compound in preferably the above ratio for 4 to 20 hours in a temperature range of 50 to 150° C. under existence of the catalyst. This reaction may be carried out without a solvent or carried out in a solvent which dissolves both the hydroxyl group-containing benzophenone-based compound and the epoxy group-containing hydrolyzable silicon compound. And, a method using a solvent is preferable for easiness of controlling the reaction and for easiness of handling. Examples of such a solvent include toluene, xylene, ethyl acetate, butyl acetate, and the like. Further, an example of the amount of the solvent used is an amount of about 10 to 300 parts by mass relative to 100 parts by mass in total of the hydroxyl group-containing benzophenone-based compound and the epoxy group-containing hydrolyzable silicon compound.

Examples of the silylated benzophenone-based compound used preferably in the present invention include a reaction product obtained by reaction of one or two hydroxyl groups of the benzophenone-based compound containing three or more hydroxyl groups with the epoxy group of the epoxy group-containing hydrolyzable silicon compound, and the like. More preferable examples include 4-(2-hydroxy-3-(3-trimethoxysilyl)propoxy)propoxy)-2,2'4'-trihydroxybenzophenone, and the like, represented by the following formula (11). Note that Me in the following formula (11) represents a methyl group.

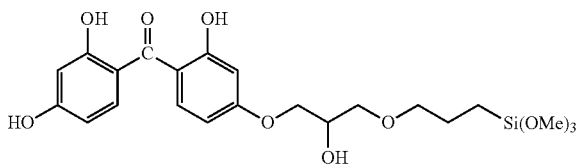

(11)

Note that in the liquid composition, when the silylated benzophenone-based compound is contained as the ultraviolet absorbent (c1), the content of the silylated benzophenone-based compound may be adjusted so that the amount calculated as follows becomes the content of the ultraviolet absorbent (c1) in the liquid composition described above.

More specifically, the amount of the silyl group having a hydrolyzable group, for example, —Si(OMe)$_3$ in the compound (11) in the silylated benzophenone-based compound is converted into $SiO_2$, and is included in the amount of the matrix component (a). Further, the amount of a part other than the silyl group having a hydrolyzable group in the silylated benzophenone-based compound, namely, the hydroxyl group-containing benzophenone-based compound residue including a linking group is regarded as the content of the ultraviolet absorbent (c1). In this manner, the parts by mass of the ultraviolet absorbent (c1) relative to 100 parts by mass of the matrix component (a) obtained is calculated.

(Infrared Absorbent (c2))

The infrared absorbent (c2) is not limited in particular as long as it has a function to absorb light in an infrared wavelength region. Specific example of the infrared absorbent (c2) is one or more selected from a composite tungsten oxide, an antimony-doped tin oxide (ATO), and a tin-doped indium oxide (ITO). Note that these infrared absorbents (c2) are used in the form of particles.

A specific example of the composite tungsten oxide is a composite tungsten oxide represented by a general formula: $M_xW_yO_z$ (where the element M is one or more elements selected from Cs, Rb, K, Tl, In, Ba, Li, Ca, Sr, Fe, and Sn, W is tungsten, O is oxygen, $0.001 \leq x/y \leq 1$, and $2.2 \leq z/y \leq 3.0$). The composite tungsten oxide represented by the above general formula effectively functions as the infrared absorbent because enough free electrons are generated therein.

Note that particles of the composite tungsten oxide represented by the above general formula: $M_xW_yO_z$ excel in durability when they have a hexagonal, tetragonal, or cubic crystal structure, and thus preferably contain one or more crystal structures selected from the hexagonal, tetragonal, and cubic crystal structures. In such a crystal structure, the amount (x) of the elements M to be added is 0.001 or more and 1.0 or less by a value of x/y which is a mole ratio with the amount (y) of tungsten, and the amount (z) of existing oxygen is 2.2 or more and 3.0 or less by a value of z/y which is a mole ratio with the amount (y) of tungsten.

Moreover, the value of x/y is preferably approximately 0.33. This is because the value of x/y calculated theoretically from the hexagonal crystal structure is 0.33 and the element M contained by an amount that makes the value of x/y be about this value, causes the composite tungsten oxide particles to exhibit preferable optical properties. Specific examples of such a composite tungsten oxide include $Cs_{0.33}WO_3$, $Rb_{0.33}WO_3$, $K_{0.33}WO_3$, $Ba_{0.33}WO_3$ and the like. The composite tungsten oxide used in the present invention is however not limited thereto, and has a useful infrared absorbing property as long as the values of x/y and z/y are within the above ranges.

Such a composite tungsten oxide is an infrared absorbent known to have a maximum value of transmittance between wavelengths of 400 nm and 700 nm, and a minimum value thereof between wavelengths of 700 nm and 1800 nm in a film in which particles thereof are dispersed evenly.

The particles of the composite tungsten oxide represented by the above general formula: $M_xW_yO_z$ can be produced by a conventional publicly-known method. The composite tungsten oxide particles can be obtained, for example, by using a tungsten compound starting material obtained by mixing an ammonium tungstate aqueous solution or a tungsten hexachloride solution with an aqueous solution of a chloride salt, a nitrate, a sulfate, an oxalate, an oxide, or the like of the element M at a predetermined ratio, and thermally treating them in an inert gas atmosphere or a reducing gas atmosphere.

Note that the surface of the composite tungsten oxide particle is preferably covered with an oxide of a metal selected from Si, Ti, Zr, Al, and the like from the viewpoint of improving weather resistance. The covering method is not particularly limited, and it is possible to cover the surface of the composite tungsten oxide particle by adding an alkoxide of the above metal to a solution in which the composite tungsten oxide particles are dispersed.

As the above ATO particles and ITO particles, it is possible to use without any particular limitation particles prepared by various conventional publicly-known preparation methods, for example: physical methods of obtaining the particles by pulverizing metal powder by a mechanochemical method and the like; chemical dry methods such as a CVD method, a vapor deposition method, a sputtering method, a thermal plasma method, and a laser method; methods called chemical wet methods by a thermal decomposition method, a chemical reduction method, an electrolysis method, a supersonic method, a laser abrasion method, a supercritical fluid method, a microwave synthesis method, and the like. Further, the crystal structures of these particles are not limited to an ordinary cubic structure, and depending on the type of the matrix component (a), for example, a hexagonal ITO with relatively low infrared absorptivity can be used as necessary.

The above composite tungsten oxide particles, the ATO particles, and the ITO particles may be used alone as the infrared absorbent (c2), or two or more of them may be used in mixture. In the present invention, the ITO particles are preferably used in view of transmittance loss and environmental safety. Moreover, at least one selected from the composite tungsten oxide particles, ATO particles, and ITO particles, and infrared-absorbing particles other than them may be combined and used as the infrared absorbent (c2).

An average primary particle diameter of particles of the infrared absorbent (c2) is preferably 100 nm or less, more preferably 50 nm or less, and particularly preferably 30 nm or less. When the average primary particle diameter is 100 nm or less, the tendency of aggregation of particles together in a liquid composition containing them does not increase, and precipitation of the particles can be avoided.

Further, the particles of the infrared absorbent (c2) may aggregate to a certain degree in the liquid composition, and the average dispersed particle diameter of the aggregated particles is preferably 200 nm or less, more preferably 150 nm or less, and particularly preferably 100 nm or less.

Above-described average primary particle diameter and average dispersed particle diameter are preferable because when a coating film is formed of the liquid composition, the coating film can suppress occurrence of haze due to scattering (increase in haze) and maintain transparency. Note that the lower limit of the average primary particle diameter is not particularly limited, and it is also possible to use the infrared absorbent (c2) particles of approximately 2 nm which can be produced by the current technology. Here, the average primary particle diameter of the particles refers to a diameter measured from an image observed under a transmission electron microscope. Further, the lower limit of the average dispersed particle diameter is not particularly limited. The average dispersed particle diameter refers to a diameter measured by the dynamic scattering method using a particle size distribution analyzer (manufactured by Microtrac Corp.: Nanotract 150).

The content of the infrared absorbent (c2) in the liquid composition is preferably 1 to 80 parts by mass, more preferably 5 to 60 parts by mass, and particularly preferably 5 to 40 parts by mass relative to 100 parts by mass of the total amount of the matrix component (a) and film-forming component (b), from the point that the coating film to be obtained has sufficient infrared absorptivity and the mechanical strength of the layer is secured.

The inorganic particles used as the infrared absorbent (c2) are preferably blended in a liquid composition in a state of a dispersion liquid prepared by dispersing the inorganic particles in a dispersion medium in advance from the viewpoint of securing sufficient dispersibility in the liquid composition. The aggregation state of the infrared absorbent (c2) particles in the coating film to be obtained reflects the aggregation state in the liquid composition and in a raw material dispersion liquid. Thus, in order to maintain the transparency of the coating film, the particles of the infrared absorbent (c2) are preferably highly dispersed in the dispersion liquid. From the viewpoint of the dispersibility, the dispersion liquid in which the particles of the infrared absorbent (c2) are dispersed is preferably a dispersion liquid in which the particles are dispersed using a later-described dispersing agent.

Note that the dispersion medium in the dispersion liquid of the infrared absorbent (c2) particles consequently constitutes, in the composition to be obtained, a part of the organic solvent contained in the composition, and it is thus preferable to use a compound similar to a later-described organic solvent or having compatibility with the organic solvent, as the dispersion medium.

Here, in the case where the liquid composition contains both the ultraviolet absorbent (c1) and the infrared absorbent (c2) as the functional component (c), the liquid composition preferably further contains a later-described chelating agent that forms a complex with the infrared absorbent (c2), the complex exhibiting substantially no absorption with respect to light having a visible wavelength for the following reason.

Ultraviolet absorbing organic compounds contained in the ultraviolet absorbent (c1) have a maximum absorption wavelength of light falling within a range of 325 to 425 nm, and often falling within a range of about 325 to 390 nm. The ultraviolet absorbing organic compounds having absorptivity with respect to ultraviolet rays with a relatively long wavelength are preferably used for their characteristics. These compounds are, however, thought to easily undergo chelate bonding with the inorganic particles constituting the infrared absorbent (c2) because of having a phenolic hydroxyl group and exhibit a yellowish color. Hence, the chelating agent, which forms a complex with the infrared absorbent (c2), the complex exhibiting substantially no absorption with respect to light having a visible wavelength, is contained together with the ultraviolet absorbent (c1) and the infrared absorbent (c2) in the liquid composition, thereby making it possible to suppress the chelate bonding of the ultraviolet absorbent (c1) with the infrared absorbent (c2) and prevent exhibition of yellowish color while maintaining the ultraviolet absorptivity.

Note that the dispersing agent in this specification generally refers to compounds having a function to increase dispersion stability of particles by having, at least in a molecule, a portion which adheres to the surface of a particle and a portion which, after adhering to the particle, extends from the portion adhering to the particle into the dispersion medium (to be a part of the organic solvent in the liquid composition) allowing stable dispersion of the particles in the liquid composition by repulsion of charges or by a three-dimensional obstacle which themselves have.

Besides, the chelating agent in this specification generally refers to compounds which are capable of coordinate bonding by one molecule to plural positions on the surfaces of particles, have a small three-dimensional obstacle after adhering to the particles due to a molecular structure, and do not have the function to increase the dispersion stability of the particles. The dispersing agent and the chelating agent are different in that the dispersing agent has a function to increase the dispersion stability whereas the chelating agent does not have the function though both of them adhere to the particle surface.

<Water (d)>

The liquid composition of the present invention contains water (d) for subjecting the hydrolyzable silicon compound contained in the (a) component to hydrolytic (co-)condensation.

The amount of water contained in the liquid composition is not particularly limited as long as it is a sufficient amount for subjecting the hydrolyzable silicon compound to the hydrolytic (co-)condensation. The amount of water is preferably 1 to 20 equivalent amount, and more preferably 4 to 18 equivalent amount, in a mole ratio to an amount converted into $SiO_2$ of the hydrolyzable silicon compound contained in the (a) component. When the amount of water is less than 1 equivalent amount in the mole ratio, the hydrolysis is difficult to proceed, and the liquid composition may be repelled when it is applied depending on the substrate or a haze may increase, and when the amount is more than 20 equivalent amount, the hydrolysis rate increases, and a long term storage property may become insufficient.

<Acid (e)>

The acid (e) contained in the liquid composition of the present invention is an acid that thermally decomposes at 80° C. or higher and equal to or lower than the heating temperature for curing the curing component in the liquid composition when forming a coating film and can make the $pH_a$ of the liquid composition after the thermal decomposition larger than the $pH_b$ before the thermal decomposition.

In the liquid composition of the present invention, preferably, the $pH_b$ is kept low to be equal to or lower than a predetermined value during storage as the liquid composition as described above for suppressing an increase in viscosity of the composition due to progress of polymerization caused by mainly progress of hydrolysis and condensation reaction of the hydrolyzable silicon compound contained in the matrix component (a). Further, it is known that in the case where the liquid composition contains the particles such as the infrared absorbent (c2), the $pH_b$ is kept low to keep the repulsive force by charges depending on the charges on the particle surface. For example, it is known that the dispersibility of ITO particles or ATO particles is secured by keeping the $pH_b$ at the predetermined value or lower, and they are apt to aggregate at a $pH_b$ higher than the predetermined value and precipitate in long-term storage.

In the liquid composition of the present invention, its $pH_b$ is preferably 5 or less to suppress an increased in viscosity and precipitation of the particles during the storage. The $pH_b$ of the liquid composition is more preferably 4.6 or less.

Generally, for curing the liquid composition by heating as a form of the applied film, the liquid composition with a higher pH is better in reactivity in the hydrolysis and condensation of the hydrolyzable silicon compound, and is sufficiently cured to form a coating film excellent in durability such as alkali resistance. The conventional liquid composition immediately after the production is sufficiently cured when forming a coating film and can form a coating film excellent in durability such as alkali resistance because hydrolyzable groups relating to the hydrolysis and condensation exist with high density even in a state of low pH.

In the liquid composition with pH adjusted to a low value, however, the hydrolysis and condensation of the hydrolyzable silicon compound proceeds during long-term storage with the result that the density of the hydrolyzable groups in the liquid composition decreases. In the applied film formed on the substrate in such a state, the hydrolyzable groups with the decreased density do not sufficiently react when it is thermally cured with the pH kept at the low value as described above, namely, sufficient curing is not carried out, bringing about a problem in durability such as alkali resistance. The problem becomes particularly prominent when the curing temperature is low (230° C. or lower).

In the present invention, use of the acid (e) makes it possible to keep the liquid composition at the low $pH_b$ until the liquid composition is produced and supplied for film formation, and to bring the $pH_a$ of the liquid composition to a value higher than the $pH_b$ by thermal decomposition of the acid (e) when the liquid composition is formed into an applied film and cured. Therefore, the liquid composition is excellent in long-term storage stability and can achieve sufficient curing by efficient reaction in thermal curing of the hydrolyzable groups with a low density in an applied film formed after long-term storage.

Specifically, the liquid composition of the present invention contains the acid (e) for achieving both of the following two states.

(A) A state in which the $pH_b$ of the liquid composition is set to be low, preferably 5 or less during production and storage, is established.

(B) A state in which the $pH_a$ is set to be higher than that during production and storage when the liquid composition is heat-cured as an applied film, is established.

The acid (e) thermally decomposes at 80° C. or higher and a temperature equal to or lower than the heating temperature for curing the curing component in the liquid composition when forming a coating film, and becomes a component with a function of acid weaker than that of the acid (e). The acid (e) is acid contained in the liquid composition and thus capable of achieving the (A) and (B) states.

An example of the temperature of heating for curing the applied film formed of the liquid composition of the present invention is a temperature range of 80 to 230° C. though depending on the composition of the matrix component (a), and a preferable temperature range is 150 to 230° C. The acid (e) made to correspond to the heating temperature is an acid (e) with a thermal decomposition temperature of 230° C. or lower. Note that preferably the acid (e) sufficiently decomposes at the heating temperature for curing, and from this viewpoint, the thermal decomposition temperature of the acid (e) is preferably the heating temperature—10° C. or lower. Accordingly, in a design of curing the liquid composition of the present invention at the heating temperature of 230° C., the acid (e) contained in the liquid composition is preferably an acid (e) with a decomposition temperature of 220° C. or lower.

The lower limit of the decomposition temperature of the acid (e) is set to a temperature not lower than the upper limit of the temperature during production and storage of the liquid composition. An example of the temperature during production of the liquid composition is about 10 to 70° C. as a temperature at which the (a) component, the (b) component and/or the (c) component, the (d) component, and the acid (e) are mixed together. The liquid composition is generally stored at 30° C. or lower. In consideration of these temperatures, the lower limit of the decomposition temperature of the acid (e) is set to 80° C. in the present invention.

The temperature at which the hydrolyzable silicon compound constituting the matrix component (a) is subjected to partial hydrolytic (co-)condensation is generally about 10 to 70° C. as described above. Preferably, the acid (e) is used as an acid catalyst for the partial hydrolytic (co-)condensation and is used as it is as the acid (e) in the liquid composition. Also in this case, the acid (e) never decomposes in the partial hydrolytic (co-)condensation when the decomposition temperature of the acid (e) is 80° C. or higher. From the above reasons, the thermal decomposition temperature of the acid (e) is 80° C. or higher and a temperature equal to or lower than the heating temperature for curing the curing component in the liquid composition when forming a coating film, and is preferably between 80° C. and 230° C.

The acid (e) is preferably an acid with which a content of the acid (e) achieving the state (A) of the liquid composition does not impair the other effects of the liquid composition of the present invention, and which decomposes in the state (B) to generate no compound functioning as acid, namely, loses the function of acid. However, when the predetermined $pH_b$ in the state (A) of the liquid composition, preferably a $pH_b$ of 5 or lower cannot be achieved only by the acid (e), the liquid composition may contain acid other than the acid (e) (hereinafter, referred to also as "another acid").

Specific examples of the acid (e) include a maleic acid (decomposition temperature: 135° C.), a succinic acid (decomposition temperature: 188° C.) and the like. As the acid (e), one of them may be used alone or two or more of them may be used in combination.

The content of the acid (e) in the liquid composition can be 0.001 to 20 mass % relative to the whole amount of the composition similarly to the content of the acid as the catalyst when the predetermined $pH_b$ can be achieved only by the acid (e). However, when the predetermined $pH_b$ cannot be achieved by the content, the acid (e) is contained in the liquid composition in combination with another acid. A specific example of the content of the acid (e) in this case is 0.001 to 20 mass % relative to the whole amount of the composition. A specific example of the content of the other acid in this case is 0.001 to 20 mass % relative to the whole amount of the composition. Specific examples of the other acid include acids, among the acids exemplified as the catalyst, not classified into the acid (e).

<Other Components>

The liquid composition of the present invention is prepared, in order to be made into a liquid form, generally as a form in which necessary components including the water (d) are dissolved and dispersed in a liquid compound other than the water (d), specifically, an organic solvent. Note that all solid contents and the water (d) in the liquid composition are need to be stably dissolved and dispersed in the organic solvent.

(Organic Solvent)

The organic solvent means a solvent which is compatible with the water (d) and dissolves the components such as the hydrolyzable silicon compound in the matrix component (a), the film-forming component (b), and the ultraviolet absorbent (c1) and a dispersion medium which disperses the solid particles such as the infrared absorbent (c2), and refers to an organic compound having a relatively low boiling point and being liquid at room temperature. The organic solvent is constituted of an organic compound such as an alcohol and may be a mixture of two or more organic compounds.

Further, the dispersion medium and the solvent may be the same organic solvent or may be different organic solvents. In the case where the dispersion medium and the solvent are different, the organic solvent in the liquid composition is a mixture of the dispersion medium and the solvent. In this case, the dispersion medium and the solvent are combined to have compatibility for a uniform mixture.

When the blended components such as the matrix component (a), the film-forming component (b), the functional component (c), in particular, the ultraviolet absorbent (c1) and the infrared absorbent (c2), and the acid (e) are provided in a state of a solution or a dispersion liquid, the solvent or dispersion medium may be used as they are without being removed, thereby constituting a part of the organic solvent and the water (d) in the liquid composition. The content of the water (d) in the liquid composition is calculated as an amount containing water thus taken in together with the various components in addition to the amount solely added as the water (d).

Specific examples of the organic solvent include: ketones such as acetone, methyl ethyl ketone, methyl isobutyl ketone, cyclohexanone, and acetylacetone; ethers such as tetrahydrofuran, 1,4-dioxane, 1,2-dimethoxyethane, propylene glycol monomethyl ether, dipropylene glycol monomethyl ether, and diisopropyl ether; esters such as ethyl acetate, butyl acetate, isobutyl acetate, and methoxyethyl acetate; alcohols such as methanol, ethanol, 1-propanol, 2-propanol, 1-butanol, 2-butanol, 2-methyl-1-propanol, 2-methoxyethanol, 4-methyl-2-pentanol, 2-butoxyethanol, 1-methoxy-2-propanol, 2-ethoxyethanol, and diacetone alcohol; hydrocarbons such as n-hexane, n-heptane, isooctane, benzene, toluene, xylene, gasoline, light oil, and kerosene; acetonitrile, nitromethane, and the like.

They may be used alone or two or more of them may be used in combination. Moreover, the amount of the organic solvent to be used is adjusted appropriately depending on the types and blending ratios of the (a) component to the (e) component, and the like.

Note that in order to obtain a state that the respective components contained in the liquid composition are stably dissolved or dispersed, the organic solvent preferably contains alcohol by at least 20 mass % or more, and more preferably 50 mass % or more. Preferable alcohols to be used for the organic solvent are methanol, ethanol, 1-propanol, 2-propanol, 1-butanol, 2-butanol, 2-methyl-1-propanol, 1-methoxy-2-propanol, 2-ethoxyethanol, 4-methyl-2-pentanol, and 2-butoxyethanol, and the like, and among them, an alcohol having a boiling point of 80 to 160° C. is preferable in view of good solubility of the silicon oxide-based matrix raw material component and a good coating property on the substrate. Specifically, ethanol, 1-propanol, 2-propanol, 1-butanol, 2-butanol, 2-methyl-1-propanol, 1-methoxy-2-propanol, 2-ethoxyethanol, 4-methyl-2-pentanol, and 2-butoxyethanol are preferable.

Further, when containing a solvent used in the process of producing the matrix component (a) or a byproduct, for example, the partially hydrolyzed (co-)condensate of the hydrolyzable silicon compound, the organic solvent to be used in the liquid composition may contain a lower alcohol or the like generated accompanying hydrolysis of the raw material hydrolyzable silicon compound (for example, silanes having an alkoky group) in the production process thereof and an alcohol or the like used as a solvent as they are.

Moreover, in the liquid composition, as an organic solvent other than the above ones, another organic solvent different from alcohol, miscible with water/alcohol, may be used in combination. Examples of the organic solvent include: ketones such as acetone and acetylacetone; esters such as ethyl acetate and isobutyl acetate; ethers such as propylene glycol monomethyl ether, dipropylene glycol monomethyl ether, diisopropyl ether, and the like.

The amount of the organic solvent contained in the liquid composition is preferably an amount to make the total solid content concentration, in the liquid composition constituted of total solids and the liquid components being the organic solvent and the water (d), be 3.5 to 50 mass %, and more preferably 9 to 30 mass %. The amount of the organic solvent in the liquid composition set to be within the above range results in good workability.

The liquid composition of the present invention, when containing the solid particles such as the infrared absorbent (c2) particles, preferably contains the dispersing agent as an optional component as described above. In particular, when the liquid composition of the present invention contains the infrared absorbent (c2) particles together with the ultraviolet absorbent (c1), the liquid composition preferably contains the chelating agent which can form a complex with the infrared absorbent (c2), the complex exhibiting substantially no absorption with respect to light having a visible wavelength.

(Another Acid)

The liquid composition of the present invention may contain the above-described other acid together with the acid (e). The type and content including preferable mode of the other acid are as described above.

(Dispersing Agent)

The dispersing agent to be blended in the liquid composition is preferably a dispersing agent having a molecular weight of 1,000 to 100,000. The content of the dispersing agent in the liquid composition is preferably a ratio of 5 to 15 parts by mass, more preferably 7 to 15 parts by mass, and particularly preferably 10 to 12 parts by mass relative to 100 parts by mass of the solid particles, for example, the infrared absorbent (c2).

The molecular weight of the dispersing agent is preferably 1,000 to 100,000, more preferably 1,500 to 100,000, and particularly preferably 2,000 to 100,000. Note that the molecular weight of the dispersing agent is a mass average molecular weight measured by gel permeation chromatography (GPC). In this specification, the molecular weight refers to a mass average molecular weight measured by gel permeation chromatography (GPC) unless otherwise stated.

The dispersing agent is not limited in particular except that the molecular weight is set to the above preferable range, and when the solid particles, for example, the respective particles constituting the infrared absorbent (c2) are applied to the various liquid compositions for forming a coating film, dispersing agents having the above molecular weight, among typically used dispersing agents, are used without any particular limitation. With the molecular weight of the dispersing agent being in the above range, even when a sufficient amount thereof for highly dispersing the solid particles, for example, the infrared absorbent (c2) particles, specifically, 5 to 15 parts by mass relative to 100 parts by mass of the solid particles, for example, the infrared absorbent (c2) is used, the dispersing agent does not bleed out from the coating film after the coating film is formed, and adhering points do not decrease relative to molecules.

The dispersing agent may be an anion-based or cation-based dispersing agent which has a functional group having an acid value or an amine value, that is, having an acidic group, basic group or a salt thereof, and may be a nonionic dispersing agent with an acid value or amine value of 0. Note that the acid value is a mass (unit mg) of potassium hydroxide (KOH) needed for neutralizing 1 g of the compound, and the amine value is expressed by the number of milligrams of KOH corresponding to the acid value, obtained by neutralization titration an amino group with an acid. In this specification, the unit of acid value and amine value is described as mgKOH/g.

In the case of the anion-based or cation-based dispersing agent, preferably, the acid value and the amine value are each in a range of 5 to 100 mgKOH/g. Note that in the case of the dispersing agent having both the acid value and the amine value, the total value only needs to be in the above range.

Specific examples of the dispersing agent include a dispersing agent constituted of a high molecular copolymer with the above molecular weight either having or not having an acidic group, a basic group, or a substituent of them in the form of salt, among high molecular dispersing agents generally used for dispersing solid particles in various liquid compositions. Examples of type of high molecular chain include urethane-based, polyimide-based, alkyd-based, epoxy-based, polyester-based, melamine-based, phenol-based, acrylic-based, polyether-based, vinyl chloride-based, vinyl chloride-vinyl acetate copolymer-based, polyamide-based, polycarbonate-based, styrene-based, and the like.

In the present invention, the type of the high molecular chain of the dispersing agent used is appropriately selected based on the type of the organic solvent used together with the water (d). Since the liquid composition contains the water (d) and preferably alcohol as the organic solvent as described above, the dispersing agent is preferably a high molecular dispersing agent containing a polyethyleneoxide group. Use of a styrene-based dispersing agent is also preferable as the dispersing agent.

As the dispersing agent, a commercially available dispersing agent for solid particles can be used. Specific examples of the dispersing agent having an acid value and an amine value include DISPERBYK-190 (molecular weight: 2,200; acid value: 10 mgKOH/g; aqueous solution having solid content of 40 mass %), DISPERBYK-180 (molecular weight: 2,000; acid value: 95 mgKOH/g; amine value: 95 mgKOH/g; solid content of 100 mass %), and DISPERBYK-185 (molecular weight: 1,500; amine value: 18 mgKOH/g; solid content of 100 mass %), and the like as product names produced by BYK-Chemie Japan which are styrene-based dispersing agents.

(Chelating Agent)

A chelating agent preferably contained in the liquid composition of the present invention which contains the ultraviolet absorbent (c1) and the infrared absorbent (c2), is a chelating agent that can form a complex with the infrared absorbent (c2), the complex exhibiting substantially no absorption with respect to light having a visible wavelength.

Note that the "exhibiting substantially no absorption" means that, for example, a liquid composition to which the chelating agent is added by 50 parts by mass relative to 100 parts by mass of the infrared absorbent (c2), is formed into a film on a substrate so that the infrared absorbent (c2) is deposited on the substrate by an amount of 0.7 g/m$^2$, where a difference between a value of YI measured on the obtained substrate with a coating film according to JIS K7105 (1981) and YI measured only on the substrate is 2.0 or less.

The molecular weight of the chelating agent is preferably 1,000 to 100,000. The molecular weight is more preferably 1,500 to 100,000, and particularly preferably 2,000 to 100,000. With the molecular weight of the chelating agent falling within the above range, even when an amount by which the chelate bonding of the ultraviolet absorbent (c1) to the particles of the infrared absorbent (c2) can be suppressed sufficiently by adhering and coordinating onto the surfaces of the infrared absorbent (c2) particles together with the dispersing agent, specifically 1 to 13 parts by mass relative to 100 parts by mass of the infrared absorbent (c2), is used, the chelating agent does not bleed out from the layer after the coating film is formed, adhering points do not decrease relative to molecules, and moreover, hardness of the coating film rarely decrease.

In the liquid composition, the dispersing agent is one having a portion which adheres to the surface of a particle of the infrared absorbent (c2) and a portion which extends into the dispersion medium (to be a part of the organic solvent) to secure dispersion stability, and is contained by an appropriate amount which secures dispersion stability of the particles of the infrared absorbent (c2) in the composition. An appropriate amount of the dispersing agent is not always enough to cover the surfaces of particles of the infrared absorbent (c2) sufficiently and to be capable of suppressing the chelate bonding of the ultraviolet absorbent (c1). In this case, when the chelating agent is contained in the liquid composition, the chelating agent can sufficiently cover the surfaces of the particles of the infrared absorbent (c2) together with the dispersing agent, and can sufficiently suppress the chelate bonding of the ultraviolet absorbent (c1) to the infrared absorbent (c2) particles.

The content of the chelating agent in the liquid composition is preferably in a ratio of 1 to 13 parts by mass relative to 100 parts by mass of the infrared absorbent (c2), and only needs to be adjusted appropriately within the above range according to the content of the dispersing agent. The above content of the chelating agent is an amount which, when the chelating agent having the above molecular weight is used together with the dispersing agent, rarely causes bleedout of the chelating agent from the obtained coating film, while sufficiently suppressing the chelate bonding of the ultraviolet absorbent (c1) to the particles of the infrared absorbent (c2) in the liquid composition.

The chelating agent may be contained in the dispersion liquid containing the particles of the infrared absorbent (c2), the dispersing agent, and the dispersion medium (to be a part of the organic solvent). Generally, the chelating agent is preferably contained in a solution in which the ultraviolet absorbent (c1), the matrix component (a), and the film-forming component (b) prepared separately from the dispersion liquid are dissolved in the organic solvent, from the point of efficiently suppressing the chelate bonding of the infrared absorbent (c2) and the ultraviolet absorbent (c1).

The chelating agent is selected appropriately according to the kind of the organic solvent used together with the water (d). Since the liquid composition contains the water (d) and contains preferably alcohol as the organic solvent as described above, a chelating agent soluble to these polar solvents is preferable.

Specific examples of such a chelating agent include a polymer in the above range of molecular weight from which one or more selected from a maleic acid, an acrylic acid, and a methacrylic acid, and the like can be obtained as monomers. The polymer may be a homopolymer or a copolymer. In the present invention, preferably, a polymaleic acid and a polyacrylic acid are used. They may be used alone or two or more of them may be used in combination. Note that a polymer from which one or more selected from a maleic acid, an acrylic acid, and a methacrylic acid can be obtained as monomers also has a function as acid. The polymers are not classified into the acid (e) because their thermal decomposition temperatures exceed the heating temperature for curing the curing component in the liquid composition when forming a coating film, for example, 230° C.

In the present invention, a commercially available product can be used as the chelating agent. Examples of the commercially available product include NONPOL PMA-50W (product name; produced by NOF Corporation; molecular weight: 1,200; aqueous solution having solid content of 40 to 48 mass %), or the like as the polymaleic acid, and AQUALIC HL (product name; produced by Nippon Shokubai Co., Ltd; molecular weight: 10,000; aqueous solution having solid content of 45.5 mass %), or the like as the polyacrylic acid.

(Preferable Combination of Compositions)

For the liquid composition of the present invention, preferably, compositions, specifically types of components and content ratios thereof are selected appropriately according to applications and required characteristics. Preferable compositions in the liquid composition of the present invention will be described below.

<Composition 1>

(a) component: a tetrafunctional hydrolyzable silicon compound by 1 to 20 mass %, converted into $SiO_2$, relative to the whole amount of the composition (b) component: polyepoxides by 0.1 to 100 parts by mass relative to 100 parts by mass of the (a) component converted into $SiO_2$ (d) component: water by 1 to 20 moles relative to 1 mole of the (a) component converted into $SiO_2$ (e) component: acid that thermally decomposes at 80° C. or higher and equal to or lower than the heating temperature for curing the tetrafunctional hydrolyzable silicon compound being the (a) component and can make the $pH_a$ of the liquid composition after the thermal decomposition larger than the $pH_b$ before the thermal decomposition, by an amount making the $pH_b$ of the liquid composition be 5 or lower organic solvent: 100 to 6000 parts by mass relative to 100 parts by mass in total of the (a) component and the (b) component <Composition 2>

(a) component: a hydrolyzable silicon compound by 1 to 20 mass %, converted into $SiO_2$, relative to the whole amount of the composition (b) component: polyepoxides by 0.1 to 100 parts by mass relative to 100 parts by mass of the (a) component converted into $SiO_2$ (c) component: one or more selected from a benzophenone-based compound, a triazine-based compound, and a benzotriazole-based compound as the ultraviolet absorbent (c1) by 1 to 200 parts by mass relative to 100 parts by mass in total of the matrix component (a) and the film-forming component (b)

(d) component: water by 1 to 20 moles relative to 1 mole of the (a) component converted into $SiO_2$ (e) component: acid that thermally decomposes at 80° C. or higher and equal to or lower than the heating temperature for curing the hydrolyzable silicon compound being the (a) component and can make the $pH_a$ of the liquid composition after the thermal decomposition larger than the $pH_b$ before the thermal decomposition, by an amount making the $pH_b$ of the liquid composition be 5 or lower organic solvent: 100 to 6000 parts by mass relative to 100 parts by mass in total of the (a) component, the (b) component, and the (c) component <Composition 3>

(a) component: a hydrolyzable silicon compound by 1 to 20 mass %, converted into $SiO_2$, relative to the whole amount of the composition (b) component: polyepoxides by 0.1 to 100 parts by mass relative to 100 parts by mass of the (a) component converted into $SiO_2$ (c) component: one or more selected from a benzophenone-based compound, a triazine-based compound, and a benzotriazole-based compound as the ultraviolet absorbent (c1) by 1 to 200 parts by mass relative to 100 parts by mass in total of the matrix component (a) and the film-forming component (b) and one or more selected from a composite tungsten oxide, an antimony-doped tin oxide (ATO), and a tin-doped indium oxide (ITO) as the infrared absorbent (c2) by 1 to 80 parts by mass relative to 100 parts by mass in total of the matrix component (a) and film-forming component (b)

(d) component: water by 1 to 20 moles relative to 1 mole of the (a) component converted into $SiO_2$ (e) component: acid that thermally decomposes at 80° C. or higher and equal to or lower than the heating temperature for curing the hydrolyzable silicon compound being the (a) component and can make the $pH_a$ of the liquid composition after the thermal decomposition larger than the $pH_b$ before the thermal decomposition, by an amount making the $pH_b$ of the liquid composition be 5 or lower organic solvent: 100 to 6000 parts by mass relative to 100 parts by mass in total of the (a) component, the (b) component, and the (c) component dispersing agent: a dispersing agent having a molecular weight of 1,000 to 100,000 by 5 to 15 parts by mass relative to 100 parts by mass of the infrared absorbent (c2)

chelating agent: a chelating agent that can form a complex with the infrared absorbent (c2), the complex exhibiting substantially no absorption with respect to light having a visible wavelength by 1 to 13 parts by mass relative to 100 parts by mass of the infrared absorbent (c2)

<Preparation of Liquid Composition>

The liquid composition contains the component (a), the (b) component and/or the (c) component, the (d) component, and the acid (e) which are necessary components, and further contains the organic solvent, the other acid, the dispersing agent, and the chelating agent as optional components by contents appropriately adjusted in the above ranges. The liquid composition can contain various optional compounding agents as necessary within a range not impairing the effects of the present invention. The optional compounding agents may include additives such as a surface conditioner, a defoaming agent and a viscosity-adjusting agent for the purpose of improving the coating property to a formed surface, generally, a substrate surface, and may contain additives such as an adhesion-imparting agent for the purpose of improving the adhesion to the substrate surface. The contents of these additives are preferably set such that an amount of each additive component is 0.01 to 2 parts by mass relative to 100 parts by mass in total of the (a) component and the (b) component. Further, the liquid composition may contain a dye, a pigment, a filler, and the like within a range not impairing the object of the present invention.

The liquid composition can be prepared by uniformly mixing the above components. The mixing method is not particularly limited, and the liquid composition can be basically prepared by a method including the following step (1) and step (2) when the liquid composition contains the (a) component, the (b) component, the ultraviolet absorbent (c1) and infrared absorbent (c2) as the (c) component, the (d) component, and the (e) component and further additionally contains the organic solvent, the dispersing agent, and the chelating agent being optional components. Note that in the case of using the other acid together with the (e) component, the other acid can be handled similarly to the acid (e) except special cases.

Step (1): a dispersion liquid production step of mixing the infrared absorbent (c2), the dispersing agent, and the dispersion medium (corresponding to a part or whole of the organic solvent) to obtain a dispersion liquid Step (2): a mixing step of mixing the dispersion liquid obtained at Step (1), the ultraviolet absorbent (c1), the chelating agent, the matrix component (a), the film-forming component (b), the water (d), the acid (e), and a residue of the organic solvent other than the organic solvent used as the dispersion medium at Step (1)

The mixing method is not particularly limited as long as it can mix them evenly. Specific examples include a mixing method by a magnetic stirrer and the like.

Further, when the liquid composition of the present invention contains the hydrolyzable silicon compound itself as the matrix component (a), a treatment to subject them to partial hydrolytic (co-)condensation may be performed in order to stabilize the liquid composition during storage or the like. Preferably, this partial hydrolytic (co-)condensation is performed under existence of an acid catalyst similarly to the above and under reaction conditions similar to the above. Generally, after one or more monomers of the hydrolyzable silicon compounds are mixed as necessary, stirring is performed at 10 to 70° C. for a predetermined time under existence of an acid catalyst, and thereby the object can be achieved. Note that in this case, the acid (e) and the other acid that may be optionally contained function as an acid catalyst. However, when the thermal decomposition temperature of the acid (e) is lower than the treatment temperature of the hydrolytic (co-)condensation, the acid (e) may be blended after the hydrolytic (co-)condensation is performed using the other acid, to obtain the liquid composition.

The liquid composition for forming a silicon oxide-based cured coating film by the sol-gel method of the present invention is thus obtained. The liquid composition of the present invention is excellent in storage stability. The liquid composition of the present invention further enables formation of a coating film excellent in durability, in particular, alkali resistance even after long-term storage. The liquid composition for forming a coating film of the present invention is applied on the surface of the substrate on which a coating film is formed, and cured by heating to form a silicon oxide-based cured coating film by the sol-gel method.

When the liquid composition of the present invention is stored at 23° C. for 48 hours after produced, and is then used to form a coating film with a film thickness of 1.0 to 7.0 μm on a substrate, and is immersed together with the substrate in an aqueous sodium hydroxide solution of 0.1 N at 23° C. for 2 hours, the decreased amount in film thickness after the immersion with respect to before the immersion is preferably 0.8 μm or less, more preferably 0.5 μm or less, and particularly preferably 0.2 μm or less. Further, when the liquid composition of the present invention is stored under a condition of 23° C. for a certain period and is then used to form a coating film with a film thickness of 1.0 to 7.0 μm on a substrate and is immersed together with the substrate in an aqueous sodium hydroxide solution of 0.1 N at 23° C. for 2 hours, the storage period during which the condition of the decreased amount in film thickness after the immersion with respect to before the immersion of 0.5 μm or less can be maintained is preferably two days or more, and more preferably four days or more.

Further, when the liquid composition of the present invention is stored under the condition of 23° C., a period until the viscosity measured by using a viscometer reaches 1.5 times that immediately after produced or the median size (D50) of the oxide particles in the composition measured by using a particle size distribution analyzer reaches 2 times that immediately after produced, is preferably two days or more and more preferably four days or more.

The material of the substrate to which the liquid composition for forming a coating film of the present invention is applied is not limited in particular, and basic examples include transparent glass, a resin, and the like. When the substrate is glass, examples of the material include ordinary soda lime glass, borosilicate glass, non-alkali glass, quartz glass and the like. As the glass substrate, it is also possible to use a glass substrate which absorbs ultraviolet rays and infrared rays. Further, when the substrate is a resin, examples of its material include an acrylic resin such as polymethyl methacrylate, an aromatic polycarbonate resin such as polyphenylene carbonate, and the like.

In the case where the liquid composition contains the infrared absorbent (c2), the visible light transmittance of the coating film tends to be low when the content ratio of the infrared absorbent (c2) in the coating film is high. Therefore, the visible light transmittance of the substrate is preferably 72% or more, and more preferably 74% or more as the visible light transmittance measured in accordance with JIS R3212 (1998).

Note that in the present invention, a glass substrate is preferable among them from the viewpoint of weather resistance of the substrate and adhesion to the substrate. A glass article will be described below, which has a coating film formed on the glass substrate by using the liquid composition of the present invention.

[Glass Article of the Present Invention]

The glass article of the present invention has a glass substrate and a coating film formed on a surface of at least part of the glass substrate by using the liquid composition of the present invention. The surface on which the coating film is formed is appropriately selected according to the application. Generally, the coating film is formed, but not limited to, on either one of main surfaces of plate-shaped glass substrate.

In order to obtain the glass article of the present invention, an example of a specific method to form on the surface of the glass substrate the coating film by using the liquid composition of the present invention is a method including a (I) step of applying the liquid composition on a coating film forming surface of a glass substrate to form an applied film, and a (II) step of removing volatile components such as the organic solvent, water and the like from the obtained applied film as necessary, and further curing the applied film by heating it to the temperature at which the acid (e) used decomposes or higher and the temperature at which the matrix component (a) is cured.

First, at the (I) step, the liquid composition is applied on the coating film forming surface of the glass substrate to form an applied film of the liquid composition. Note that the applied film formed here is generally an applied film containing the volatile components such as the organic solvent, water and the like. The method of applying the liquid composition onto the glass substrate is not limited in particular as long as it is a method of applying evenly, and a publicly known method such as a flow coating method, a dip coating method, a spin coating method, a spray coating method, a flexographic printing method, a screen printing method, a gravure printing method, a roll coating method, a meniscus coating method, a die coating method, or the like can be used. The thickness of the applied film of the coating liquid is determined in consideration of the thickness of the coating film to be finally obtained.

The (II) step to be performed next is carried out after conditions are selected appropriately according to the acid (e) used and the matrix component (a). More specifically, at the (II) step, the volatile components such as the organic solvent, water and the like are removed as necessary from the applied film of the liquid composition on the glass substrate, and the hydrolyzable silicon compound and the other curing component if it is contained, are heated and cured to form a coating film. In this event, the heating temperature is set equal to or higher than the thermal decomposition temperature of the acid (e). Preferably, the heating temperature is a temperature equal to or higher than the thermal composition temperature of the acid (e)+10° C.

In this case, removal of the volatile components from the applied film at the (II) step is preferably performed by heating and/or reduced-pressure drying. After the applied film is formed on the glass substrate, temporary drying performed at a temperature of room temperature to about 120° C. is preferable from the viewpoint of improving the leveling property of the applied film. Generally, during this operation of temporary drying, the volatile components are evaporated and removed in parallel therewith, and thus an operation of removing the volatile components can be said to be included in the temporary drying. The time of the temporary drying, that is, the time of the operation for removing the volatile components depends on the liquid composition used for forming a coating film and is preferably about 3 seconds to 2 hours.

Note that in this event, the volatile components are preferably removed sufficiently, but need not be completely removed. It is possible that a part of the volatile components remain on the coating film within a range not affecting the performance of the coating film to be obtained finally. Further, in the case of performing heating for removing the volatile components, the heating for removing the volatile components, that is, temporary drying in general and thereafter, the hydrolyzable silicon compound and the other curing component if it is contained, heating for curing them which is performed as follows, may be performed sequentially.

Preferably, after the volatile components are removed from the applied film as described above, the curing component such as the hydrolyzable silicon compound is cured by heating, whereby the coating film is obtained. The heating temperature in this case has preferably an upper limit of 230° C. from the economical viewpoint and because the applied film contains an organic matter in many cases. To achieve the effect of accelerating the reaction by heating, the lower limit of the heating temperature is preferably 80° C., and more preferably 150° C. Accordingly, this heating temperature is in a temperature range of the thermal decomposition temperature of the acid (e) or higher, preferably in a range of 80 to 230° C., and more preferably in a range of 150 to 230° C. The heating period is preferably several minutes to several hours though depending on the composition of the liquid composition used for forming a coating film.

The liquid composition of the present invention is excellent in storage stability and capable of forming a coating film excellent in durability, in particular, alkali resistance even after long-term storage, and therefore enables economical production with good productivity by easing the restriction of the liquid composition due to expiration date, for the glass article of the present invention produced as described above.

In the glass article of the present invention having the coating film, the film thickness of the coating film is preferably 1.0 to 7.0 μm, and more preferably 1.5 to 5.5 μm. With a film thickness of the coating film of less than 1.0 μm, in particular, when the functional component (c) that imparts a predetermined function to the coating film is contained, the function, for example, a function of ultraviolet absorption and infrared absorption cannot be sufficiently exhibited in some cases. Further, when the film thickness of the coating film is more than 7.0 μm, cracks may occur.

In the glass article of the present invention having the above coating film, when a 1000-rotation abrasion test with a CS-10F abrasive wheel in accordance with JIS R3212 (1998) is carried out on the surface of the coating film, the increased amount in haze after the test with respect to before the test is preferably 7% or less, and more preferably 5% or less.

In the glass article of the present invention having the above coating film, when the liquid composition for forming the coating film contains, for example, the ultraviolet absorbent (c1) as the functional component (c), the ultraviolet transmittance of the glass article of the present invention measured by using a spectrophotometer (manufactured by Hitachi, Ltd.: U-4100) is preferably 3.0% or less, more preferably 1.0% or less, and particularly preferably 0.5% or less as ultraviolet transmittance measured in accordance with ISO-9050 (1990).

In the glass article of the present invention having the above coating film, when the liquid composition for forming the coating film contains, for example, the infrared absorbent (c2) as the functional component (c), the solar radiation transmittance of the glass article of the present invention is preferably 46.0% or less, more preferably 45.0% or less, and particularly preferably 43.0% or less as solar radiation transmittance measured in accordance with JIS R3106 (1998). Further, in this case, the transmittance of light with a wavelength of 1500 nm is preferably 35% or less, and more preferably 30% or less.

Moreover, in the glass article of the present invention having the above coating film, even when the liquid composition for forming the coating film contains, for example, the ultraviolet absorbent (c1) and/or the infrared absorbent (c2) as the functional component (c), the visible light transmittance of the glass article of the present invention is preferably 50% or more, more preferably 70% or more, and particularly preferably 72% or more as visible light transmittance measured in accordance with JIS R3212 (1998).

Similarly, in the glass article of the present invention having the above coating film, even when the liquid composition for forming the coating film contains, for example, the ultraviolet absorbent (c1) and/or the infrared absorbent (c2) as the functional component (c), YI that is an index for yellowish color calculated in accordance with JIS K7105 (1981) is preferably 12 or less, and more preferably 5 or less.

The glass article having a coating film formed using the liquid composition of the present invention is a glass article having a coating film which is excellent in film-forming property or having various functions imparted thereto, and is applicable to exterior glass articles, for example, window glass for a vehicle such as an automobile, window glass for a building material to be attached to an architecture such as a house or a building, and the like. Further, the present invention can provide a glass article having a silicon oxide-based cured coating film formed by the sol-gel method using the liquid composition, which is a useful glass article and can be economically produced with good productivity.

EXAMPLES

Hereinafter, the present invention will be concretely described by taking examples, but the present invention is not limited to these examples. Note that examples 1 to 12 are examples, and examples 13 to 16 are comparative examples.

Compounds and commercially available products (product names) and the like used for preparing the compositions for forming the layers in the examples will be described below.

(Ultraviolet absorbent (c1))

Silylated ultraviolet absorbent (11);

4-(2-hydroxy-3-(3-trimethoxysilyl)propoxy)propoxy)-2, 2'4'-trihydroxybenzophenone represented by the above formula (11) synthesized in the following preparation example.

(Film-Forming Component (b); Flexibility-Imparting Component)

SR-SEP; produced by SAKAMOTO YAKUHIN KOGYO CO., LTD., sorbitol-based polyglycidyl ether (Organic Solvent)

SOLMIX AP-1; produced by Japan Alcohol Trading Co., Ltd., a mixed solvent of ethanol: 2-propanol: methanol=85.5:13.4:1.1 (mass ratio)

(Infrared Absorbent (c2))

ITO ultrafine particles; produced by Mitsubishi Materials Corporation (with an average primary particle diameter of 20 nm, and an average dispersed particle diameter of 55 nm), hereinafter abbreviated as "ITO" as appropriate.

Cesium-containing tungsten oxide (CWO) particle dispersion liquid: produced by Sumitomo Metal Mining Co., Ltd., a dispersion liquid made by diluting the CWO particle dispersion liquid (with an average dispersed particle diameter of 92 nm) with an AP-1/MIBK (methyl isobutyl ketone) mixed solvent so that the solid content concentration of the CWO particles becomes 20 mass %, hereinafter abbreviated as "CWO" as appropriate.

(Dispersing Agent)

DISPERBYK-190; produced by BYK-Chemie Japan, a 40 mass % aqueous solution of a dispersing agent having an acid value of 10 mgKOH/g and a molecular weight of 2,200, hereinafter abbreviated as "BYK190" as appropriate.

(Chelating Agent)

NONPOL PMA-50W; produced by NOF Corporation, a maleic acid polymer solution of an aqueous solution having a solid content of 40 to 48 mass %, and having both the function as the chelating agent and the function as the acid.

However, it is an acid that does not thermally decompose at 230° C. or lower, hereinafter abbreviated as "PMA-50W" as appropriate. The chelating agent here is the solid content of the coating film to be obtained. In later-described Tables 1 to 3, its mass % is listed in a column of the "other component" as a total content of the chelating agent and the surface conditioner.

(Matrix Component (a); Silicon Oxide Particles)

$SiO_2$ particle dispersion liquid; produced by Nissan Chemical Industries, Ltd., colloidal silica made by dispersing silicon oxide particles (30 mass %) with an average primary particle diameter of 10 to 20 nm in methanol (Surface Conditioner)

BYK307: produced by BYK-Chemie Japan, polyether-modified polydimethylsiloxane

<Preparation Example of Silylated Ultraviolet Absorbent (11) Solution>

Into a container, 49.2 g of 2,2',4,4'-tetrahydroxybenzophenone (produced by BASF), 123.2 g of 3-glycidoxypropyltrimethoxysilane (produced by Shi-Etsu Chemical Co., Ltd.), 0.8 g of benzyltriethylammonium chloride (produced by JUNSEI CHEMICAL CO., LTD.), and 100 g of butyl acetate (produced by JUNSEI CHEMICAL CO., LTD.) were put together and heated to 60° C. while stirring, dissolved, and heated up to 120° C. and subjected to reaction for 4 hours, to thereby obtain a silylated ultraviolet absorbent (11) solution having a solid content concentration of 63 mass %.

<Preparation Example of ITO Dispersion Liquid>

Using a ball mill, 11.9 g of ITO ultrafine particles, 3.0 g of DISPERBYK-190, and 24.2 g of SOLMIX AP-1 were subjected to dispersion processing for 48 hours, SOLMIX AP-1 was further added thereafter to dilute it so that the ITO solid content concentration became 20 mass %, thereby obtaining an ITO dispersion liquid.

Example 1

Into a container, 11.4 g of silylated ultraviolet absorbent (11) solution, 46.2 g of SOLMIX AP-1, 14.2 g of tetraethoxysilane as the matrix component (a), 0.87 g of SR-SEP, 18.4 g of pure water, 0.06 g of BYK307, 0.10 g of nitric acid aqueous solution having a concentration of 63 mass % (hereinafter, abbreviated as "63% nitric acid" as appropriate) as the other acid, and 0.012 g of maleic acid as the thermally decomposable acid (e) were put together and stirred at 50° C. for 2 hours, and then 8.7 g of ITO dispersion liquid was added thereto, thereby obtaining a liquid composition 1 having a solid content concentration of 14 mass %.

The liquid composition 1 immediately after produced was applied by the spin coating method onto a high heat-absorbing green glass (produced by ASAHI GLASS COMPANY, LIMITED, size; 10×10 mm, thickness; 3.5 mm) with a cleaned surface, and heated at 200° C. for 30 minutes in the air, thereby obtaining a glass article with coating film 1a.

Further, the obtained liquid composition 1 was stored in a thermostatic oven at 23° C. for 48 hours. The liquid composition 1 after the storage and the high heat-absorbing green glass similar to the above were used to obtain a glass article with coating film 1b by the same method as the production method of the above glass article with coating film 1a.

<Coating Film Component Composition>

The ratio of the silicon oxide ($SiO_2$) component constituting the coating film was calculated by the following formula.

$SiO_2$ component ratio in coating film [%]=($SiO_2$ component amount in liquid composition [g]/ solid content amount in liquid composition [g])×100

$SiO_2$ component amount in liquid composition [g]=(tetrafunctional hydrolyzable silicon compound amount [g]× $SiO_2$ molecular weight [g/mol]/tetrafunctional hydrolyzable silicon compound molecular weight [g/mol]+silylated ultraviolet absorbent (11) amount [g]×$SiO_2$ component molecular weight in silylated ultraviolet absorbent (11) (60.2 [g/mol])/silylated ultraviolet absorbent (11) molecular weight [g/mol]

The ratio of the film-forming component (b) constituting the coating film was calculated by the following formula.

Film-forming component (b) ratio in coating film [%]=(SR–SEP amount in liquid composition [g]/solid content amount in liquid composition [g])×100

The ratio of the ultraviolet absorbent (c1) constituting the coating film was calculated by the following formula.

Ultraviolet absorbent (c1) ratio in coating film [%]= (silylated ultraviolet absorbent (11) amount× amount of part other than trimethoxysilyl groups in silylated ultraviolet absorbent (11) (81.8 [mass %])/solid content amount in liquid composition [g])×100

The ratio of the infrared absorbent (c2) constituting the coating film was calculated by the following formula.

Infrared absorbent (c2) ratio in coating film [%]= (ITO dispersion liquid amount in liquid composition [g]×ITO solid content amount in ITO dispersion liquid (20 [mass %])/solid content amount in liquid composition [g])×100

[Evaluation]

The liquid composition 1, the glass article with coating film 1a and the glass article with coating film 1b obtained in the above were evaluated by the following method. The results are listed together with the composition of the liquid composition 1 in Table 1.

<pH>

The $pH_b$ of the liquid composition 1 immediately after produced was measured by a pH meter (manufactured by Horiba, Ltd., D-50).

<Liquid Life>

The viscosity of the liquid composition 1 was measured using a viscometer (manufactured by Toyo Seiki Seisaku-Sho, Ltd., RE-80L) and the particle size distribution of oxide particles in the liquid composition 1 was measured using a particle size distribution analyzer (manufactured by Microtrac Corp.: Nanotrac 150) every time one day elapsed. The number of days until one day before the day when the viscosity reached 1.5 times or the median size (D50) of the oxide particles reached 2 times that immediately after preparation of the liquid composition 1 was regarded as the liquid life. The liquid composition having a liquid life of 10 days or more was evaluated as having a liquid life of 10 days.

<Spectral Characteristics>

The spectral characteristics of the glass article with coating film 1a, 1b were measured by using a spectrophotometer (manufactured by Hitachi, Ltd.: U-4100), and a visible light transmittance (Tv [%]) was calculated in accordance with JIS R3212 (1998), an ultraviolet transmittance (Tuv [%]) was calculated in accordance with ISO-9050 (1990), and YI was calculated in accordance JIS K7105 (1981). The transmittance in a wavelength of 1500 nm is further listed as T1500 in Table 1.

37

<Film Thickness>

The film thickness [μm] of the coating film was measured by using a stylus type surface profile measuring instrument (ULVAC: Dektak 150).

<Alkali Resistance>

The glass article with coating film 1a, 1b was immersed in an aqueous sodium hydroxide solution of 0.1 N at 23° C. for 2 hours, and the film thicknesses before and after the immersion were measured, and the film thickness decreased value [μm] calculated from the difference between them was regarded as an index of the alkali resistance.

<Abrasion Resistance>

A 1000-rotation abrasion test was carried out with a CS-10F abrasive wheel on the coating film surface of the glass article with coating film 1a, 1b by the method described in JIS-R3212 (1998) using the Taber's abrasion resistance tester, the degrees of scratch before and after the test were measured by the haze (haze value), and the abrasion resistance was evaluated by an increased amount in haze [%]. The measurement of the haze was performed using a haze meter (manufactured by BYK-Gardner GmbH:).

Example 2

A liquid composition 1 similar to that in Example 1 was produced as in Example 1, its film thickness was made smaller than that in Example 1 by increasing the rotation speed of the spin coating, and a glass article with coating film 2a was obtained from the liquid composition 1 immediately after produced and a glass article with coating film 2b was obtained from the liquid composition 1 after stored at 23° C. for 48 hours. The obtained glass articles with coating film 2a, 2b were evaluated as in Example 1. Their evaluation results are listed in Table 1.

Example 3

A liquid composition 3 was produced as in Example 1 except that the content of maleic acid was changed to the amount listed in Table 1, and a glass article with coating film 3a was obtained from the liquid composition 3 immediately after produced and a glass article with coating film 3b was obtained from the liquid composition 3 after stored at 23° C. for 48 hours as in Example 1. The obtained liquid composition 3, glass articles with coating film 3a, 3b were evaluated as in Example 1. Their evaluation results are listed together with the composition of the liquid composition 3 in Table 1.

Example 4

A liquid composition 4 was produced as in Example 1 except that a succinic acid was used by the amount listed in Table 1 in place of the maleic acid as the thermally decomposable acid (e), and a glass article with coating film 4a was obtained from the liquid composition 4 immediately after produced and a glass article with coating film 4b was obtained from the liquid composition 4 after stored at 23° C. for 48 hours as in Example 1. The obtained liquid composition 4, glass articles with coating film 4a, 4b were evaluated as in Example 1. Their evaluation results are listed together with the composition of the liquid composition 4 in Table 1.

Example 5

A liquid composition 5 was produced as in Example 1 except that the contents of 63% nitric acid and SR-SEP were changed to the amounts listed in Table 1, and a glass article with coating film 5a was obtained from the liquid composition 5 immediately after produced and a glass article with coating film 5b was obtained from the liquid composition 5 after stored at 23° C. for 48 hours as in Example 1. The obtained liquid composition 5, glass articles with coating film 5a, 5b were evaluated as in Example 1. Their evaluation results are listed together with the composition of the liquid composition 5 in Table 1.

Example 6

A liquid composition 6 was produced as in Example 1 except that the contents of 63% nitric acid and SR-SEP were changed to the amounts listed in Table 1, and a glass article with coating film 6a was obtained from the liquid composition 6 immediately after produced and a glass article with coating film 6b was obtained from the liquid composition 6 after stored at 23° C. for 48 hours as in Example 1. The obtained liquid composition 6, glass articles with coating film 6a, 6b were evaluated as in Example 1. Their evaluation results are listed together with the composition of the liquid composition 6 in Table 1.

Example 7

A liquid composition 7 was produced as in Example 1 except that the content of ITO dispersion liquid was changed to the amount listed in Table 2 and the amounts of the components other than maleic acid, 63% nitric acid and BYK307 were changed to the amounts listed in Table 2, and a glass article with coating film 7a was obtained from the liquid composition 7 immediately after produced and a glass article with coating film 7b was obtained from the liquid composition 7 after stored at 23° C. for 48 hours as in Example 1. The obtained liquid composition 7, glass articles with coating film 7a, 7b were evaluated as in Example 1. Their evaluation results are listed together with the composition of the liquid composition 7 in Table 2.

Example 8

A liquid composition 8 was produced as in Example 1 except that 63% nitric acid was not added and the contents of SOLMIX AP-1, maleic acid, SR-SEP, and pure water were changed to the amounts listed in Table 2, and a glass article with coating film 8a was obtained from the liquid composition 8 immediately after produced and a glass article with coating film 8b was obtained from the liquid composition 8 after stored at 23° C. for 48 hours as in Example 1. The obtained liquid composition 8, glass articles with coating film 8a, 8b were evaluated as in Example 1. Their evaluation results are listed together with the composition of the liquid composition 8 in Table 2.

Example 9

Into a container, 11.4 g of silylated ultraviolet absorbent (11) solution, 46.3 g of SOLMIX AP-1, 14.2 g of tetraethoxysilane, 0.87 g of SR-SEP, 18.3 g of pure water, 0.06 g of BYK307, 0.15 g of NONPOL PMA-50W, and 0.012 g of maleic acid as the thermally decomposable acid (e) were put together and stirred at 50° C. for 2 hours, and then 8.7 g of ITO dispersion liquid was added thereto, thereby obtaining a liquid composition 9 having a solid content concentration of 14%. A glass article with coating film 9a was obtained from the liquid composition 9 immediately after produced and a glass article with coating film 9b was obtained from the liquid composition 9 after stored at 23° C. for 48 hours as in Example 1 except that the liquid composition 9 was used in place of the liquid composition 1. The obtained liquid composition 9, glass articles with coating film 9a, 9b were evaluated as in Example 1. Their evaluation results are listed together with the composition of the liquid composition 9 in Table 2.

Example 10

A liquid composition 10 was produced as in Example 1 except that ITO dispersion liquid was changed to cesium-containing tungsten oxide (CWO) particle dispersion liquid, and a glass article with coating film 10a was obtained from the liquid composition 10 immediately after produced and a glass article with coating film 10b was obtained from the liquid composition 10 after stored at 23° C. for 48 hours as in Example 1. The obtained liquid composition 10, glass articles with coating film 10a, 10b were evaluated as in Example 1. Their evaluation results are listed together with the composition of the liquid composition 10 in Table 2.

Example 11

A liquid composition 11 was produced as in Example 1 except that 8.7 g of ITO dispersion liquid was changed to 2.5 g of $SiO_2$ particle dispersion liquid and the amounts of the components other than maleic acid, 63% nitric acid and BYK307 were changed to the amounts listed in Table 2, and a glass article with coating film 11a was obtained from the liquid composition 11 immediately after produced and a glass article with coating film 11b was obtained from the liquid composition 11 after stored at 23° C. for 48 hours as in Example 1. The obtained liquid composition 11, glass articles with coating film 11a, 11b were evaluated as in Example 1. Their evaluation results are listed together with the composition of the liquid composition 11 in Table 2.

Example 12

A liquid composition 1 similar to that in Example 1 was produced as in Example 1. The liquid composition 1 immediately after produced was applied by the spin coating method onto high heat-absorbing green glass with a cleaned surface as in Example 1, and heated at 250° C. for 30 minutes in the air, thereby obtaining glass article with coating film 12a. Further, the liquid composition 1 after stored in a thermostatic oven at 23° C. for 48 hours was used to produce a glass article with coating film 12b similarly to the glass with coating film 12a. The obtained glass article with coating film 12a and glass article with coating film 12b were evaluated as in Example 1. Their evaluation results are listed in Table 2.

Example 13

Into a container, 11.4 g of silylated ultraviolet absorbent (11) solution, 46.3 g of SOLMIX AP-1, 14.2 g of tetraethoxysilane, 0.83 g of SR-SEP, 18.4 g of pure water, 0.06 g of BYK307, and 0.15 g of nitric acid aqueous solution having a concentration of 63 mass % were put together and stirred at 50° C. for 2 hours, and then 8.7 g of ITO dispersion liquid was added thereto, thereby obtaining a liquid composition 13 having a solid content concentration of 14% without containing the thermally decomposable acid (e). A glass article with coating film 13a was obtained from the liquid composition 13 immediately after produced and a glass article with coating film 13b was obtained from the liquid composition 13 after stored at 23° C. for 48 hours as in Example 1 except that the liquid composition 13 was used in place of the liquid composition 1. The obtained liquid composition 13, glass articles with coating film 13a, 13b were evaluated as in Example 1. Their evaluation results are listed together with the composition of the liquid composition 13 in Table 3.

Example 14

A liquid composition 14 was produced as in Example 1 except that maleic acid being the thermally decomposable acid (e) was not added and the content of SOLMIX AP-1 was changed to the amount listed in Table 3, and a glass article with coating film 14a was obtained from the liquid composition 14 immediately after produced and a glass article with coating film 14b was obtained from the liquid composition 14 after stored at 23° C. for 48 hours as in Example 1. The obtained liquid composition 14, glass articles with coating film 14a, 14b were evaluated as in Example 1. Their evaluation results are listed together with the composition of the liquid composition 14 in Table 3.

Example 15

Into a container, 11.4 g of silylated ultraviolet absorbent (11) solution, 46.3 g of SOLMIX AP-1, 14.2 g of tetraethoxysilane, 0.90 g of SR-SEP, 18.4 g of pure water, 0.06 g of BYK307, and 0.05 g of nitric acid aqueous solution having a concentration of 63 mass % were put together and stirred at 50° C. for 2 hours, and then 8.7 g of ITO dispersion liquid was added thereto, thereby obtaining a liquid composition 15 having a solid content concentration of 14% without containing the thermally decomposable acid (e). A glass article with coating film 15a was obtained from the liquid composition 15 immediately after produced as in Example 1 except that the liquid composition 15 was used in place of the liquid composition 1. Here, the liquid composition 15 quickly increased in viscosity during storage, and therefore could not be applied after stored in a thermostatic oven at 23° C. for 2 days because of high viscosity, failing to produce a glass article with coating film 15b similar to the glass article with coating film 1b. The obtained liquid composition and glass article with coating film 15a were evaluated as in Example 1. Their evaluation results are listed together with the composition of the liquid composition 15 in Table 3.

Example 16

Into a container, 11.4 g of silylated ultraviolet absorbent (11) solution, 46.3 g of SOLMIX AP-1, 14.2 g of tetraethoxysilane, 0.80 g of SR-SEP, 18.3 g of pure water, 0.06 g of BYK307, and 0.19 g of nitric acid aqueous solution having a concentration of 63 mass % were put together and stirred at 50° C. for 2 hours, and then 8.7 g of ITO dispersion liquid was added thereto, thereby obtaining a liquid composition 16 having a solid content concentration of 14% without containing the thermally decomposable acid (e). A glass article with coating film 16a was obtained from the liquid composition 16 immediately after produced and a glass article with coating film 16b was obtained from the liquid composition 16 after stored at 23° C. for 48 hours as in Example 1 except that the liquid composition 16 was used in place of the liquid composition 1. The obtained liquid composition 16, glass articles with coating film 16a, 16b were evaluated as in Example 1. Their evaluation results are listed together with the composition of the liquid composition 16 in Table 3.

TABLE 1

|  |  |  | Example 1 | Example 2 | Example 3 | Example 4 | Example 5 | Example 6 |
|---|---|---|---|---|---|---|---|---|
| Composition of liquid composition (g) | Solvent | AP-1 | 46.2 | 46.2 | 46.2 | 46.2 | 46.2 | 46.2 |
|  | (a) | TEOS | 14.2 | 14.2 | 14.2 | 14.2 | 14.2 | 14.2 |
|  |  | $SiO_2$ particle dispersion liquid | — | — | — | — | — | — |
|  | (b) | SR-SEP | 0.87 | 0.87 | 0.87 | 0.87 | 0.89 | 0.83 |
|  | (c1); including (a) | Silylated ultraviolet absorbent (11) solution | 11.4 | 11.4 | 11.4 | 11.4 | 11.4 | 11.4 |
|  | (c2) | Infrared absorbent (kind) | ITO | ITO | ITO | ITO | ITO | ITO |
|  |  | Infrared absorbent dispersion liquid (amount) | 8.7 | 8.7 | 8.7 | 8.7 | 8.7 | 8.7 |
|  | (d) | Pure water | 18.4 | 18.4 | 18.4 | 18.4 | 18.4 | 18.4 |
|  | (e) | Acid (e): kind | Maleic acid | Maleic acid | Maleic acid | Succinic acid | Maleic acid | Maleic acid |
|  |  | Thermal decomposition temperature [° C.] | 135 | 135 | 135 | 188 | 135 | 135 |
|  |  | Amount of acid (e) | 0.012 | 0.012 | 0.005 | 0.024 | 0.012 | 0.012 |
|  | Other acid | Other acid(kind) | 63% nitric acid | 63% nitric acid | 63% nitric acid | 63% nitric acid | 63% nitric acid | 63% nitric acid |
|  |  | Other acid (amount) | 0.10 | 0.10 | 0.10 | 0.10 | 0.06 | 0.15 |
|  | Surface conditioner | BYK307 | 0.06 | 0.06 | 0.06 | 0.06 | 0.06 | 0.06 |
| Composition characteristics | $pH_b$ |  | 3.9 | 3.9 | 4.2 | 3.9 | 4.6 | 3.5 |
|  | Solid content concentration [mass %] |  | 14% | 14% | 14% | 14% | 14% | 14% |
|  | Solid content composition [mass %] | (a) component (converted into $SiO_2$) | 38.8% | 38.8% | 38.8% | 38.8% | 38.7% | 38.9% |
|  |  | (b) component | 6.2% | 6.2% | 6.2% | 6.2% | 6.4% | 6.0% |
|  |  | (c1) component | 42.1% | 42.1% | 42.1% | 42.1% | 42.0% | 42.2% |
|  |  | (c2) component | 12.5% | 12.5% | 12.5% | 12.5% | 12.5% | 12.6% |
|  |  | Other component | 0.4% | 0.4% | 0.4% | 0.4% | 0.4% | 0.4% |
|  | Liquid life (day) |  | 10 | 10 | 7 | 10 | 4 | 10 |
| Glass article characteristics | Immediately after production of composition | Tv[%] | 72.8 | 73.4 | 72.5 | 72.7 | 72.7 | 72.9 |
|  |  | Tuv[%] | 0.20 | 0.86 | 0.19 | 0.22 | 0.25 | 0.14 |
|  |  | YI | 10.0 | 9.0 | 10.0 | 9.9 | 9.8 | 10.0 |
|  |  | T1500[%] | 17.8 | 29.5 | 17.9 | 20.6 | 22.1 | 19.1 |
|  |  | Film thickness [mm] | 3.6 | 1.8 | 3.9 | 3.7 | 3.5 | 3.7 |
|  |  | Alkali resistance (film thickness decreased amount [μm]) | 0.1 | 0.1 | 0.1 | 0.1 | 0.1 | 0.5 |
|  |  | Abrasion resistance (increased amount in haze [%]) | 3.3 | 2.2 | 3.6 | 3.8 | 3.4 | 3.6 |
|  | 48 hours after production of composition | Tv[%] | 72.4 | 73.2 | 72.6 | 72.7 | 72.4 | 72.5 |
|  |  | Tuv[%] | 0.25 | 0.72 | 0.22 | 0.28 | 0.20 | 0.14 |
|  |  | YI | 10.0 | 9.0 | 10.0 | 9.9 | 9.8 | 10.0 |
|  |  | T1500[%] | 17.8 | 29.5 | 17.9 | 20.6 | 22.1 | 19.1 |
|  |  | Film thickness [mm] | 4.0 | 1.7 | 4.0 | 3.6 | 3.4 | 3.8 |
|  |  | Alkali resistance (film thickness decreased amount [μm]) | 0.1 | 0.1 | 0.05 | 0.1 | 0.05 | 0.5 |
|  |  | Abrasion resistance (increased amount in haze [%]) | 3.5 | 2.5 | 3.4 | 3.2 | 3.6 | 3.5 |

TABLE 2

|  |  |  | Example 7 | Example 8 | Example 9 | Example 10 | Example 11 | Example 12 |
|---|---|---|---|---|---|---|---|---|
| Composition of liquid composition (g) | Solvent | AP-1 | 46.5 | 46.3 | 46.3 | 46.2 | 48.9 | 46.2 |
|  | (a) | TEOS | 14.7 | 14.2 | 14.2 | 14.2 | 15.3 | 14.2 |
|  |  | $SiO_2$ particle dispersion liquid | — | — | — | — | 2.5 | — |
|  | (b) | SR-SEP | 0.89 | 0.94 | 0.87 | 0.87 | 0.94 | 0.87 |
|  | (c1); including (a) | Silylated ultraviolet absorbent (11) solution | 11.7 | 11.4 | 11.4 | 11.4 | 12.3 | 11.4 |
|  | (c2) | Infrared absorbent (kind) | ITO | ITO | ITO | CWO | — | ITO |
|  |  | Infrared absorbent dispersion liquid (amount) | 7.0 | 8.7 | 8.7 | 8.7 | — | 8.7 |
|  | (d) | Pure water | 19.0 | 18.2 | 18.3 | 18.4 | 19.9 | 18.4 |
|  | (e) | Acid (e): kind | Maleic acid | Maleic acid | Maleic acid | Maleic acid | Maleic acid | Maleic acid |

TABLE 2-continued

|  |  |  | Example 7 | Example 8 | Example 9 | Example 10 | Example 11 | Example 12 |
|---|---|---|---|---|---|---|---|---|
| Composition characteristics | | Thermal decomposition temperature [° C.] | 135 | 135 | 135 | 135 | 135 | 135 |
| | | Amount of acid (e) | 0.012 | 0.218 | 0.012 | 0.012 | 0.012 | 0.012 |
| | Other acid | Other acid(kind) | 63% nitric acid | — | PMA-50W | 63% nitric acid | 63% nitric acid | 63% nitric acid |
| | | Other acid (amount) | 0.10 | 0.00 | 0.15 | 0.10 | 0.10 | 0.10 |
| | Surface conditioner | BYK307 | 0.06 | 0.06 | 0.06 | 0.06 | 0.06 | 0.06 |
| | $pH_b$ | | 3.9 | 3.0 | 3.9 | 3.9 | 3.9 | 3.9 |
| | Solid content concentration [mass %] | | 14% | 14% | 14% | 14% | 14% | 14% |
| | Solid content composition [mass %] | (a) component (converted into $SiO_2$) | 39.9% | 38.6% | 38.6% | 38.8% | 47.3% | 38.8% |
| | | (b) component | 6.4% | 6.7% | 6.2% | 6.2% | 6.7% | 6.2% |
| | | (c1) component | 43.3% | 41.8% | 41.8% | 42.1% | 45.5% | 42.1% |
| | | (c2) component | 10.1% | 12.5% | 12.5% | 12.5% | — | 12.5% |
| | | Other component | 0.4% | 0.4% | 1.0% | 0.4% | 0.4% | 0.4% |
| Glass article characteristics | Liquid life (day) | | 10 | 10 | 10 | 3 | 10 | 10 |
| | Immediately after production of composition | Tv[%] | 73.1 | 72.2 | 72.4 | 71.6 | 73.7 | 72.8 |
| | | Tuv[%] | 0.26 | 0.13 | 0.19 | 0.16 | 0.20 | 0.22 |
| | | YI | 9.0 | 9.6 | 9.8 | 8.9 | 8.9 | 10.9 |
| | | T1500[%] | 23.2 | 16.4 | 17.9 | 28.7 | 42.8 | 19.0 |
| | | Film thickness [mm] | 3.9 | 4.0 | 3.8 | 4.0 | 4.0 | 3.9 |
| | | Alkali resistance (film thickness decreased amount [μm]) | 0.1 | 0.5 | 0.1 | 0.1 | 0.1 | 0.1 |
| | | Abrasion resistance (increased amount in haze [%]) | 3.8 | 3.5 | 3.7 | 4.3 | 3.1 | 3.8 |
| | 48 hours after production of composition | Tv[%] | 72.6 | 72.6 | 72.2 | 71.0 | 73.7 | 72.1 |
| | | Tuv[%] | 0.21 | 0.15 | 0.19 | 0.10 | 0.14 | 0.28 |
| | | YI | 9.0 | 9.6 | 9.8 | 8.9 | 8.9 | 10.8 |
| | | T1500[%] | 23.2 | 16.4 | 17.9 | 28.7 | 42.8 | 18.4 |
| | | Film thickness [mm] | 3.9 | 4.2 | 3.9 | 4.0 | 3.9 | 4.0 |
| | | Alkali resistance (film thickness decreased amount [μm]) | 0.1 | 0.5 | 0.1 | 0.1 | 0.05 | 0.05 |
| | | Abrasion resistance (increased amount in haze [%]) | 3.0 | 3.1 | 3.4 | 4.5 | 3.0 | 3.5 |

TABLE 3

|  |  |  | Example 13 | Example 14 | Example 15 | Example 16 |
|---|---|---|---|---|---|---|
| Composition of liquid composition (g) | Solvent | AP-1 | 46.3 | 46.3 | 46.3 | 46.3 |
| | (a) | TEOS | 14.2 | 14.2 | 14.2 | 14.2 |
| | | $SiO_2$ particle dispersion liquid | — | — | — | — |
| | (b) | SR-SEP | 0.83 | 0.87 | 0.90 | 0.80 |
| | (c1); including (a) | Silylated ultraviolet absorbent (11) solution | 11.4 | 11.4 | 11.4 | 11.4 |
| | (c2) | Infrared absorbent (kind) | ITO | ITO | ITO | ITO |
| | | Infrared absorbent dispersion liquid (amount) | 8.7 | 8.7 | 8.7 | 8.7 |
| | (d) | Pure water | 18.4 | 18.4 | 18.4 | 18.3 |
| | (e) | Acid (e): kind | — | — | — | — |
| | | Thermal decomposition temperature [° C.] | — | — | — | — |
| | | Amount of acid (e) | — | — | — | — |
| | Other acid | Other acid(kind) | 63% nitric acid | 63% nitric acid | 63% nitric acid | 63% nitric acid |
| | | Other acid (amount) | 0.15 | 0.10 | 0.05 | 0.19 |
| | Surface conditioner | BYK307 | 0.06 | 0.06 | 0.06 | 0.06 |
| Composition characteristics | $pH_b$ | | 3.9 | 4.6 | 5.5 | 2.7 |
| | Solid content concentration [mass %] | | 14% | 14% | 14% | 14% |
| | Solid content composition [mass %] | (a) component (converted into $SiO_2$) | 38.9% | 38.8% | 38.7% | 39.0% |
| | | (b) component | 6.0% | 6.2% | 6.5% | 5.8% |
| | | (c1) component | 42.2% | 42.1% | 41.9% | 42.3% |
| | | (c2) component | 12.6% | 12.5% | 12.5% | 12.6% |
| | | Other component | 0.4% | 0.4% | 0.4% | 0.4% |
| Glass article characteristics | Liquid life (day) | | 10 | 1 | <1 | 10 |
| | Immediately after production of composition | Tv[%] | 72.6 | 72.5 | 72.7 | 73.1 |
| | | Tuv[%] | 0.24 | 0.24 | 0.20 | 0.19 |
| | | YI | 9.8 | 10.0 | 9.6 | 9.4 |
| | | T1500[%] | 18.6 | 19.1 | 18.9 | 18.3 |
| | | Film thickness [mm] | 3.7 | 4.2 | 3.4 | 3.8 |
| | | Alkali resistance (film thickness decreased amount [μm]) | 0.2 | 0.1 | 0.1 | 0.8 |
| | | Abrasion resistance (increased amount in haze [%]) | 3.2 | 3.7 | 3.9 | 4.0 |
| | 48 hours after production of composition | Tv[%] | 72.7 | 72.6 | — | 72.5 |
| | | Tuv[%] | 0.23 | 0.22 | — | 0.21 |
| | | YI | 9.8 | 10.0 | — | 10.0 |

TABLE 3-continued

|  | Example 13 | Example 14 | Example 15 | Example 16 |
| --- | --- | --- | --- | --- |
| T1500[%] | 18.6 | 19.0 | — | 19.1 |
| Film thickness [mm] | 4.0 | 4.1 | — | 3.9 |
| Alkali resistance (film thickness decreased amount [μm]) | 1.0 | 0.05 | — | 3.0 |
| Abrasion resistance (increased amount in haze [%]) | 3.4 | 3.7 | — | 3.6 |

A glass article having a coating film formed using a liquid composition of the present invention is a glass article having a coating film which is excellent in film-forming property or has various functions imparted thereto, and is applicable to exterior glass articles, for example, window glass for a vehicle such as an automobile, window glass for a building material to be attached to an architecture such as a house or a building, and the like. Further, the present invention can provide a glass article having a silicon oxide-based cured coating film formed by the sol-gel method using the liquid composition, which is a useful glass article and can be economically produced with good productivity.

What is claimed is:

1. A liquid composition, comprising:
   a hydrolyzable silicon compound (a) which upon hydrolysis and condensation reaction forms a silicon oxide ($SiO_2$) matrix;
   a functional component (c) comprising an ultraviolet absorbent (c1) and an infrared absorbent (c2);
   water (d);
   a chelating agent which is a polymer comprising as polymerized units one or more selected from maleic acid, an acrylic acid and a methacrylic acid,
   an organic solvent compatible with water; and
   an acid (e) which thermally decomposes at a temperature from 80° C. to 230° C.,
   wherein the content of the hydrolyzable silicon compound (a) is 20 to 60 mass % as a $SiO_2$ equivalent content relative to the total solid content amount in the liquid composition, and
   a pH of the liquid composition is 5 or less.

2. The liquid composition according to claim 1, further comprising from 0.1 to 100 parts by mass relative to 100 parts by mass of the hydrolyzable silicon compound (a) of a film-forming component (b).

3. The liquid composition according to claim 1, wherein the acid (e) thermally decomposes at a temperature from 80° C. to 230° C.

4. The liquid composition according to claim 1, wherein the pH of the liquid composition when the acid (e) thermally decomposes is greater than 5.

5. The liquid composition according to claim 1, wherein the hydrolyzable silicon compound comprises a tetrafunctional alkoxysilane compound.

6. The liquid composition according to claim 1, wherein the acid (e) comprises at least one of maleic acid and succinic acid.

7. The liquid composition according to claim 2, wherein the content of the infrared absorbent (c2) is 5 to 40 parts by mass relative to 100 parts by mass of the total amount of the hydrolyzable silicon compound (a) and film-forming component (b).

8. The liquid composition according to claim 2, wherein the film-forming component (b) comprises a polyepoxide.

9. The liquid composition according to claim 1, wherein when the liquid composition is stored at 23° C. for 48 hours after produced is used to form a coating film with a film thickness of 1.0 to 7.0 μm on a substrate and is immersed together with the substrate in an aqueous sodium hydroxide solution of 0.1 N at 23° C. for 2 hours, a decreased amount in film thickness after the immersion with respect to before the immersion is 0.5 μm or less.

10. The liquid composition according to claim 1, wherein the ultraviolet absorbent (c1) is a silylated ultraviolet absorbent having a phenolic hydroxyl group.

11. The liquid composition according to claim 1, further comprising at least one selected from the group consisting of an acid different from the acid (e), and a dispersing agent.

12. The liquid composition according to claim 1, wherein a molecular weight of the chelating agent is from 1,000 to 100,000 g/mole.

13. The liquid composition according to claim 1, wherein a thermal decomposition temperature of the polymeric chelating agent exceeds 230° C.

14. The liquid composition according to claim 1, wherein a content of the polymeric chelating agent is from 1 to 13 parts by mass relative to 100 parts by mass of the infrared absorbent (c2).

15. A method of forming a coating film using the liquid composition according to claim 1 on a surface of a substrate, the method comprising:
   applying the liquid composition to the surface to form an applied film; and
   curing the applied film by heating the applied film to a temperature at which the acid (e) is decomposed or higher and a temperature at which the matrix component (a) is cured.

16. A glass article comprising a glass substrate and a coating film obtained according to the method of claim 15 on a surface of at least a part of the glass substrate.

17. The glass article according to claim 16, wherein a film thickness of the coating film is 1.0 to 7.0 μm.

18. The glass article according to claim 16, wherein a visible light transmittance measured in accordance with JIS R3212 (1998) is 70% or more, and an ultraviolet transmittance measured in accordance with ISO-9050 (1990) is 3% or less.

19. The glass article according to claim 16, wherein a solar radiation transmittance measured in accordance with JIS R3106 (1998) is 46% or less.

20. The glass article according to claim 16, wherein when a 1000-rotation abrasion test with a CS-10F abrasive wheel in accordance with JIS R3212 (1998) is carried out on a surface of the coating film, an increased amount in haze after the test with respect to before the test is 5% or less.

* * * * *